United States Patent
Kalkunte et al.

(10) Patent No.: US 7,471,688 B2
(45) Date of Patent: Dec. 30, 2008

(54) SCHEDULING SYSTEM FOR TRANSMISSION OF CELLS TO ATM VIRTUAL CIRCUITS AND DSL PORTS

(75) Inventors: Suresh S. Kalkunte, Marlborough, MA (US); Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 1369 days.

(21) Appl. No.: 10/176,298

(22) Filed: Jun. 18, 2002

(65) Prior Publication Data

US 2003/0231635 A1    Dec. 18, 2003

(51) Int. Cl.
H04L 12/56   (2006.01)
H04J 3/16    (2006.01)
(52) U.S. Cl. .................. 370/395.4; 370/468; 370/412
(58) Field of Classification Search ........... 370/395.42, 370/412, 468
See application file for complete search history.

(56) References Cited

U.S. PATENT DOCUMENTS

| | | |
|---|---|---|
| 3,373,408 A | 3/1968 | Ling |
| 3,478,322 A | 11/1969 | Evans |
| 3,623,001 A | 11/1971 | Kleist et al. |
| 3,736,566 A | 5/1973 | Anderson et al. |
| 3,792,441 A | 2/1974 | Wymore et al. |
| 3,889,243 A | 6/1975 | Drimak |
| 3,940,745 A | 2/1976 | Sajeva |
| 4,016,548 A | 4/1977 | Law et al. |
| 4,032,899 A | 6/1977 | Jenny et al. |
| 4,075,691 A | 2/1978 | Davis et al. |
| 4,130,890 A | 12/1978 | Adam |
| 4,400,770 A | 8/1983 | Chan et al. |
| 4,514,807 A | 4/1985 | Nogi |
| 4,523,272 A | 6/1985 | Fukunaga et al. |
| 4,658,351 A | 4/1987 | Teng |
| 4,709,347 A | 11/1987 | Kirk |
| 4,745,544 A | 5/1988 | Renner et al. |
| 4,788,640 A | 11/1988 | Hansen |
| 4,831,358 A | 5/1989 | Ferrio et al. |

(Continued)

FOREIGN PATENT DOCUMENTS

EP    0 379 709    8/1990

(Continued)

OTHER PUBLICATIONS

"The ATM Forum Technical Committee Traffic Management Specifications Version 4.1", *The ATM Forum* (Mar. 1999).

(Continued)

*Primary Examiner*—Seema S Rao
*Assistant Examiner*—Christine Duong
(74) *Attorney, Agent, or Firm*—Fish & Richardson P.C.

(57) ABSTRACT

A system and method for controlling transmission of cells is described. The cells are associated with virtual circuits that either require shaping according to constant bit rate (CBR) or real-time variable bit rate (rt-VBR), or no shaping with transmit selection based on priority (for services other than CBR and rt-VBR). The system transmits the shaped and unshaped traffic using one or more circular control structures. The control structures have time slots at the granularity of the maximum system transmit rate.

35 Claims, 16 Drawing Sheets

U.S. PATENT DOCUMENTS

| | | |
|---|---|---|
| 4,858,108 A | 8/1989 | Ogawa et al. |
| 4,866,664 A | 9/1989 | Burkhardt, Jr. et al. |
| 4,890,218 A | 12/1989 | Bram |
| 4,890,222 A | 12/1989 | Kirk |
| 4,991,112 A | 2/1991 | Callemyn |
| 5,115,507 A | 5/1992 | Callemyn |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,251,205 A | 10/1993 | Callon et al. |
| 5,255,239 A | 10/1993 | Taborn et al. |
| 5,263,169 A | 11/1993 | Genusov et al. |
| 5,313,454 A | 5/1994 | Bustini et al. |
| 5,347,648 A | 9/1994 | Stamm et al. |
| 5,367,678 A | 11/1994 | Lee et al. |
| 5,379,295 A | 1/1995 | Yonehara |
| 5,379,432 A | 1/1995 | Orton et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,469 A | 4/1995 | Chung |
| 5,404,482 A | 4/1995 | Stamm et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,452,452 A | 9/1995 | Gaetner et al. |
| 5,459,842 A | 10/1995 | Begun et al. |
| 5,459,843 A | 10/1995 | Davis et al. |
| 5,463,625 A | 10/1995 | Yasrebi |
| 5,467,452 A | 11/1995 | Blum et al. |
| 5,475,856 A | 12/1995 | Kogge |
| 5,485,455 A | 1/1996 | Dobbins et al. |
| 5,515,296 A | 5/1996 | Agarwal |
| 5,517,648 A | 5/1996 | Bertone et al. |
| 5,539,737 A | 7/1996 | Lo et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,476 A | 10/1996 | Sherer et al. |
| 5,568,617 A | 10/1996 | Kametani |
| 5,574,922 A | 11/1996 | James |
| 5,581,729 A | 12/1996 | Nishtala et al. |
| 5,592,622 A | 1/1997 | Isfeld et al. |
| 5,613,071 A | 3/1997 | Rankin et al. |
| 5,613,136 A | 3/1997 | Casavant et al. |
| 5,617,327 A | 4/1997 | Duncan |
| 5,623,489 A | 4/1997 | Cotton et al. |
| 5,627,829 A | 5/1997 | Gleeson et al. |
| 5,630,074 A | 5/1997 | Beltran |
| 5,630,130 A | 5/1997 | Perotto et al. |
| 5,633,865 A | 5/1997 | Short |
| 5,644,623 A | 7/1997 | Gulledge |
| 5,649,110 A | 7/1997 | Ben-Nun et al. |
| 5,649,157 A | 7/1997 | Williams |
| 5,651,002 A | 7/1997 | Van Seters et al. |
| 5,659,687 A | 8/1997 | Kim et al. |
| 5,680,641 A | 10/1997 | Sidman |
| 5,689,566 A | 11/1997 | Nguyen |
| 5,692,126 A | 11/1997 | Templeton et al. |
| 5,699,537 A | 12/1997 | Sharangpani et al. |
| 5,701,434 A | 12/1997 | Nakagawa |
| 5,717,898 A | 2/1998 | Kagan et al. |
| 5,721,870 A | 2/1998 | Matsumoto |
| 5,724,574 A | 3/1998 | Stratigos et al. |
| 5,740,402 A | 4/1998 | Bratt et al. |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,754,764 A | 5/1998 | Davis et al. |
| 5,761,507 A | 6/1998 | Govett |
| 5,761,522 A | 6/1998 | Hisanaga et al. |
| 5,764,915 A | 6/1998 | Heimsoth et al. |
| 5,768,528 A | 6/1998 | Stumm |
| 5,781,551 A | 7/1998 | Born |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,805,816 A | 9/1998 | Picazo, Jr. et al. |
| 5,809,235 A | 9/1998 | Sharma et al. |
| 5,809,237 A | 9/1998 | Watts et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,828,881 A | 10/1998 | Wang |
| 5,828,901 A | 10/1998 | O'Toole et al. |
| 5,832,215 A | 11/1998 | Kato et al. |
| 5,835,755 A | 11/1998 | Stellwagen, Jr. |
| 5,838,988 A | 11/1998 | Panwar et al. |
| 5,850,399 A * | 12/1998 | Ganmukhi et al. .......... 370/412 |
| 5,850,530 A | 12/1998 | Chen et al. |
| 5,854,922 A | 12/1998 | Gravenstein et al. |
| 5,857,188 A | 1/1999 | Douglas |
| 5,860,138 A | 1/1999 | Engebretsen et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,898,686 A | 4/1999 | Virgile |
| 5,898,701 A | 4/1999 | Johnson |
| 5,905,876 A | 5/1999 | Pawlowski et al. |
| 5,905,889 A | 5/1999 | Wilhelm, Jr. |
| 5,909,686 A | 6/1999 | Muller et al. |
| 5,915,123 A | 6/1999 | Mirsky et al. |
| 5,918,235 A | 6/1999 | Kirshenbaum et al. |
| 5,933,627 A | 8/1999 | Parady et al. |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,953,336 A * | 9/1999 | Moore et al. ........... 370/395.43 |
| 5,958,031 A | 9/1999 | Kim |
| 5,961,628 A | 10/1999 | Nguyen et al. |
| 5,968,169 A | 10/1999 | Pickett |
| 5,970,013 A | 10/1999 | Fischer et al. |
| 5,974,518 A | 10/1999 | Nogradi |
| 5,978,838 A | 11/1999 | Mohamed et al. |
| 5,983,274 A | 11/1999 | Hyder et al. |
| 5,995,513 A | 11/1999 | Harrand et al. |
| 6,012,151 A | 1/2000 | Mano |
| 6,014,729 A | 1/2000 | Lannan et al. |
| 6,023,742 A | 2/2000 | Ebeling et al. |
| 6,032,190 A | 2/2000 | Bremer et al. |
| 6,032,218 A | 2/2000 | Lewin et al. |
| 6,047,002 A | 4/2000 | Hartmann et al. |
| 6,049,867 A | 4/2000 | Eickemeyer et al. |
| 6,058,168 A | 5/2000 | Braband |
| 6,061,710 A | 5/2000 | Eickemeyer et al. |
| 6,067,300 A | 5/2000 | Baumert et al. |

| Patent No. | Date | Inventor(s) | Ref |
|---|---|---|---|
| 6,067,585 A | 5/2000 | Hoang | |
| 6,070,231 A | 5/2000 | Ottinger | |
| 6,072,781 A | 6/2000 | Feeney et al. | |
| 6,073,215 A | 6/2000 | Snyder | |
| 6,079,008 A | 6/2000 | Clery, III | |
| 6,085,215 A | 7/2000 | Ramakrishnan et al. | |
| 6,085,248 A | 7/2000 | Sambamurthy et al. | |
| 6,085,294 A | 7/2000 | Van Doren et al. | |
| 6,092,127 A | 7/2000 | Tausheck | |
| 6,092,158 A | 7/2000 | Harriman et al. | |
| 6,104,700 A | 8/2000 | Haddock et al. | |
| 6,111,886 A | 8/2000 | Stewart | |
| 6,112,016 A | 8/2000 | MacWilliams et al. | |
| 6,122,251 A | 9/2000 | Shinohara | |
| 6,128,669 A | 10/2000 | Moriarty et al. | |
| 6,134,665 A | 10/2000 | Klein et al. | |
| 6,141,677 A | 10/2000 | Hanif et al. | |
| 6,141,689 A | 10/2000 | Yasrebi | |
| 6,141,765 A | 10/2000 | Sherman | |
| 6,144,669 A | 11/2000 | Williams et al. | |
| 6,145,054 A | 11/2000 | Mehrotra et al. | |
| 6,157,955 A | 12/2000 | Narad et al. | |
| 6,160,562 A | 12/2000 | Chin et al. | |
| 6,170,051 B1 | 1/2001 | Dowling | |
| 6,175,927 B1 | 1/2001 | Cromer et al. | |
| 6,182,177 B1 | 1/2001 | Harriman | |
| 6,195,676 B1 | 2/2001 | Spix et al. | |
| 6,199,133 B1 | 3/2001 | Schnell | |
| 6,201,807 B1 | 3/2001 | Prasanna | |
| 6,212,542 B1 | 4/2001 | Kahle et al. | |
| 6,212,544 B1 | 4/2001 | Borkenhagen et al. | |
| 6,212,604 B1 | 4/2001 | Tremblay | |
| 6,212,611 B1 | 4/2001 | Nizar et al. | |
| 6,216,220 B1 | 4/2001 | Hwang | |
| 6,223,207 B1 | 4/2001 | Lucovsky et al. | |
| 6,223,238 B1 | 4/2001 | Meyer et al. | |
| 6,223,243 B1 | 4/2001 | Ueda et al. | |
| 6,223,274 B1 | 4/2001 | Catthoor et al. | |
| 6,223,279 B1 | 4/2001 | Nishimura et al. | |
| 6,247,025 B1 | 6/2001 | Bacon | |
| 6,256,713 B1 | 7/2001 | Audityan et al. | |
| 6,269,391 B1 | 7/2001 | Gillespie | |
| 6,272,109 B1 | 8/2001 | Pei et al. | |
| 6,272,520 B1 | 8/2001 | Sharangpani et al. | |
| 6,272,616 B1 | 8/2001 | Fernando et al. | |
| 6,275,505 B1 | 8/2001 | O'Loughlin et al. | |
| 6,279,113 B1 | 8/2001 | Vaidya | |
| 6,282,169 B1 | 8/2001 | Kiremidjian | |
| 6,286,083 B1 | 9/2001 | Chin et al. | |
| 6,289,011 B1 | 9/2001 | Seo et al. | |
| 6,295,600 B1 | 9/2001 | Parady | |
| 6,298,370 B1 | 10/2001 | Tang et al. | |
| 6,307,789 B1 | 10/2001 | Wolrich et al. | |
| 6,311,261 B1 | 10/2001 | Chamdani et al. | |
| 6,320,861 B1 | 11/2001 | Adam et al. | |
| 6,324,624 B1 | 11/2001 | Wolrich et al. | |
| 6,335,932 B2 | 1/2002 | Kadambi et al. | |
| 6,338,078 B1 | 1/2002 | Chang et al. | |
| 6,345,334 B1 | 2/2002 | Nakagawa et al. | |
| 6,347,344 B1 | 2/2002 | Baker et al. | |
| 6,349,331 B1 | 2/2002 | Andra et al. | |
| 6,356,962 B1 | 3/2002 | Kasper et al. | |
| 6,359,911 B1 | 3/2002 | Movshovich et al. | |
| 6,360,262 B1 | 3/2002 | Guenthner et al. | |
| 6,360,277 B1 | 3/2002 | Ruckley et al. | |
| 6,366,998 B1 | 4/2002 | Mohamed | |
| 6,373,848 B1 | 4/2002 | Allison et al. | |
| 6,377,998 B2 | 4/2002 | Noll et al. | |
| 6,389,031 B1 | 5/2002 | Chao et al. | |
| 6,389,449 B1 | 5/2002 | Nemirovsky et al. | |
| 6,393,026 B1 | 5/2002 | Irwin | |
| 6,393,483 B1 | 5/2002 | Latif et al. | |
| 6,404,737 B1 * | 6/2002 | Novick et al. | 370/235.1 |
| 6,415,338 B1 | 7/2002 | Habot | |
| 6,418,488 B1 | 7/2002 | Chilton et al. | |
| 6,424,657 B1 | 7/2002 | Voit et al. | |
| 6,424,659 B2 | 7/2002 | Viswanadham et al. | |
| 6,426,940 B1 | 7/2002 | Seo et al. | |
| 6,426,943 B1 * | 7/2002 | Spinney et al. | 370/235 |
| 6,427,196 B1 | 7/2002 | Adiletta et al. | |
| 6,430,626 B1 | 8/2002 | Witkowski et al. | |
| 6,434,145 B1 | 8/2002 | Opsasnick et al. | |
| 6,438,132 B1 | 8/2002 | Vincent et al. | |
| 6,438,134 B1 * | 8/2002 | Chow et al. | 370/412 |
| 6,448,812 B1 | 9/2002 | Bacigalupo | |
| 6,453,404 B1 | 9/2002 | Bereznyi et al. | |
| 6,457,015 B1 | 9/2002 | Eastham | |
| 6,463,035 B1 | 10/2002 | Moore | |
| 6,463,072 B1 | 10/2002 | Wolrich et al. | |
| 6,463,480 B2 | 10/2002 | Kikuchi et al. | |
| 6,463,527 B1 | 10/2002 | Vishkin | |
| 6,466,898 B1 | 10/2002 | Chan | |
| 6,477,562 B2 | 11/2002 | Nemirovsky et al. | |
| 6,484,224 B1 | 11/2002 | Robins et al. | |
| 6,501,731 B1 | 12/2002 | Chong et al. | |
| 6,507,862 B1 | 1/2003 | Joy et al. | |
| 6,522,188 B1 | 2/2003 | Poole | |
| 6,526,451 B2 | 2/2003 | Kasper | |
| 6,526,452 B1 | 2/2003 | Petersen et al. | |
| 6,529,983 B1 | 3/2003 | Marshall et al. | |
| 6,532,509 B1 | 3/2003 | Wolrich et al. | |
| 6,535,878 B1 | 3/2003 | Guedalia et al. | |
| 6,552,826 B2 | 4/2003 | Adler et al. | |
| 6,553,406 B1 | 4/2003 | Berger et al. | |
| 6,560,667 B1 | 5/2003 | Wolrich et al. | |
| 6,570,850 B1 | 5/2003 | Gutierrez et al. | |
| 6,577,542 B2 | 6/2003 | Wolrich et al. | |
| 6,584,522 B1 | 6/2003 | Wolrich et al. | |
| 6,587,906 B2 | 7/2003 | Wolrich et al. | |
| 6,604,125 B1 | 8/2003 | Belkin | |
| 6,606,704 B1 | 8/2003 | Adiletta et al. | |
| 6,625,654 B1 | 9/2003 | Wolrich et al. | |
| 6,628,668 B1 * | 9/2003 | Hutzli et al. | 370/468 |
| 6,629,147 B1 | 9/2003 | Grow | |
| 6,629,236 B1 | 9/2003 | Aipperspach et al. | |
| 6,631,422 B1 | 10/2003 | Althaus et al. | |
| 6,631,430 B1 | 10/2003 | Wolrich et al. | |
| 6,631,462 B1 | 10/2003 | Wolrich et al. | |
| 6,657,963 B1 | 12/2003 | Paquette et al. | |
| 6,658,551 B1 | 12/2003 | Berenbaum et al. | |
| 6,661,774 B1 * | 12/2003 | Lauffenburger et al. | 370/230.1 |
| 6,661,794 B1 | 12/2003 | Wolrich et al. | |
| 6,665,699 B1 | 12/2003 | Hunter et al. | |
| 6,665,755 B2 | 12/2003 | Modelski et al. | |
| 6,667,920 B2 | 12/2003 | Wolrich et al. | |
| 6,668,317 B1 | 12/2003 | Bernstein et al. | |
| 6,671,827 B2 | 12/2003 | Guilford et al. | |
| 6,675,190 B1 | 1/2004 | Schabernack et al. | |
| 6,675,192 B2 | 1/2004 | Emer et al. | |
| 6,678,746 B1 | 1/2004 | Russell et al. | |
| 6,680,933 B1 * | 1/2004 | Cheesman et al. | 370/352 |
| 6,681,300 B2 | 1/2004 | Wolrich et al. | |
| 6,684,326 B1 | 1/2004 | Cromer et al. | |
| 6,694,380 B1 | 2/2004 | Wolrich et al. | |
| 6,697,379 B1 | 2/2004 | Jacquet et al. | |
| 6,721,325 B1 * | 4/2004 | Duckering et al. | 370/395.4 |
| 6,724,767 B1 | 4/2004 | Chong et al. | |
| 6,728,845 B2 | 4/2004 | Adiletta | |
| 6,732,187 B1 | 5/2004 | Lougheed et al. | |
| 6,754,211 B1 | 6/2004 | Brown | |
| 6,754,222 B1 | 6/2004 | Joung et al. | |
| 6,768,717 B1 | 7/2004 | Reynolds et al. | |
| 6,775,284 B1 | 8/2004 | Calvignac et al. | |
| 6,792,488 B2 | 9/2004 | Wolrich et al. | |
| 6,798,744 B1 | 9/2004 | Loewen et al. | |
| 6,826,615 B2 | 11/2004 | Barrall et al. | |

| | | |
|---|---|---|
| 6,834,053 B1 * | 12/2004 | Stacey et al. .............. 370/395.4 |
| 6,850,521 B1 | 2/2005 | Kadambi et al. |
| 6,856,622 B1 | 2/2005 | Calamvokis et al. |
| 6,873,618 B1 | 3/2005 | Weaver |
| 6,876,561 B2 | 4/2005 | Wolrich et al. |
| 6,895,457 B2 | 5/2005 | Wolrich et al. |
| 6,925,637 B2 | 8/2005 | Thomas et al. |
| 6,931,641 B1 | 8/2005 | Davis et al. |
| 6,934,780 B2 | 8/2005 | Modelski et al. |
| 6,934,951 B2 | 8/2005 | Wilkinson et al. |
| 6,938,147 B1 | 8/2005 | Joy et al. |
| 6,944,850 B2 | 9/2005 | Hooper et al. |
| 6,947,425 B1 | 9/2005 | Hooper et al. |
| 6,952,824 B1 | 10/2005 | Hooper et al. |
| 6,959,002 B2 | 10/2005 | Wynne et al. |
| 6,967,963 B1 | 11/2005 | Houh et al. |
| 6,976,095 B1 | 12/2005 | Wolrich et al. |
| 6,981,077 B2 | 12/2005 | Modelski et al. |
| 6,983,350 B1 | 1/2006 | Adiletta et al. |
| 7,006,495 B2 | 2/2006 | Hooper |
| 7,065,569 B2 * | 6/2006 | Teraslinna ................... 709/223 |
| 7,069,548 B2 | 6/2006 | Kushlis |
| 7,096,277 B2 | 8/2006 | Hooper |
| 7,100,102 B2 | 8/2006 | Hooper et al. |
| 7,111,072 B1 | 9/2006 | Matthews et al. |
| 7,111,296 B2 | 9/2006 | Wolrich et al. |
| 7,124,196 B2 | 10/2006 | Hooper |
| 7,126,952 B2 | 10/2006 | Hooper et al. |
| 7,149,786 B1 | 12/2006 | Bohringer et al. |
| 7,181,742 B2 | 2/2007 | Hooper |
| 7,191,321 B2 | 3/2007 | Bernstein et al. |
| 7,206,858 B2 | 4/2007 | Hooper et al. |
| 7,248,584 B2 | 7/2007 | Hooper |
| 7,305,500 B2 | 12/2007 | Adiletta et al. |
| 7,328,289 B2 | 2/2008 | Wolrich et al. |
| 7,352,769 B2 | 4/2008 | Hooper et al. |
| 2001/0023487 A1 | 9/2001 | Kawamoto |
| 2002/0027448 A1 | 3/2002 | Bacigalupo |
| 2002/0041520 A1 | 4/2002 | Wolrich et al. |
| 2002/0075878 A1 | 6/2002 | Lee et al. |
| 2002/0118692 A1 | 8/2002 | Oberman et al. |
| 2002/0150047 A1 * | 10/2002 | Knight et al. ............. 370/230.1 |
| 2002/0181194 A1 | 12/2002 | Ho et al. |
| 2003/0043803 A1 | 3/2003 | Hooper |
| 2003/0067934 A1 | 4/2003 | Hooper et al. |
| 2003/0086434 A1 | 5/2003 | Kloth |
| 2003/0105901 A1 | 6/2003 | Wolrich et al. |
| 2003/0105917 A1 | 6/2003 | Ostler et al. |
| 2003/0110166 A1 | 6/2003 | Wolrich et al. |
| 2003/0115347 A1 | 6/2003 | Wolrich et al. |
| 2003/0115426 A1 | 6/2003 | Rosenbluth et al. |
| 2003/0131198 A1 | 7/2003 | Wolrich et al. |
| 2003/0140196 A1 | 7/2003 | Wolrich et al. |
| 2003/0145159 A1 | 7/2003 | Adiletta et al. |
| 2003/0147409 A1 | 8/2003 | Wolrich et al. |
| 2003/0161303 A1 | 8/2003 | Mehrvar et al. |
| 2003/0161337 A1 | 8/2003 | Weinman |
| 2003/0196012 A1 | 10/2003 | Wolrich et al. |
| 2003/0210574 A1 | 11/2003 | Wolrich et al. |
| 2004/0039895 A1 | 2/2004 | Wolrich et al. |
| 2004/0052269 A1 | 3/2004 | Hooper et al. |
| 2004/0054880 A1 | 3/2004 | Bernstein et al. |
| 2004/0059828 A1 | 3/2004 | Hooper et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0085901 A1 | 5/2004 | Hooper et al. |
| 2004/0098496 A1 | 5/2004 | Wolrich et al. |
| 2004/0109369 A1 | 6/2004 | Wolrich et al. |
| 2004/0148382 A1 | 7/2004 | Narad et al. |
| 2004/0162933 A1 | 8/2004 | Adletta et al. |
| 2004/0252686 A1 | 12/2004 | Hooper et al. |
| 2005/0033884 A1 | 2/2005 | Wolrich et al. |
| 2005/0149665 A1 | 7/2005 | Wolrich et al. |
| 2006/0007871 A1 | 1/2006 | Welin |
| 2006/0069882 A1 | 3/2006 | Wheeler et al. |
| 2006/0156303 A1 | 7/2006 | Hooper et al. |

FOREIGN PATENT DOCUMENTS

| | | |
|---|---|---|
| EP | 0 464 715 | 1/1992 |
| EP | 0 663 678 | 1/1995 |
| EP | 0 745 933 | 12/1996 |
| EP | 0 773 648 | 5/1997 |
| EP | 0 809 180 | 11/1997 |
| EP | 0 959 602 | 11/1999 |
| JP | 59-111533 | 6/1984 |
| WO | WO 94/15287 | 7/1994 |
| WO | WO 97/38372 | 10/1997 |
| WO | WO 98/20647 | 5/1998 |
| WO | WO 00/38376 | 6/2000 |
| WO | WO 00/56024 | 9/2000 |
| WO | WO 01/16718 | 3/2001 |
| WO | WO 01/16769 | 3/2001 |
| WO | WO 01/16770 | 3/2001 |
| WO | WO 01/16782 | 3/2001 |
| WO | WO 01/17179 | 3/2001 |
| WO | WO 01/31856 | 5/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO03/030461 | 4/2003 |

OTHER PUBLICATIONS

"10-/100-Mbps Ethernet Media Access Controller (MAC) Core", NEC, 1998, pp. 1-5.

"Enterprise Hardware, Intel Expected to Unveil New Networking Chip," News.Com, Aug. 26, 1999, <http://new.com.com/Intel+expected+to+unveil+now+networking+chip/2100-1001_3-230315.html> (accessed on Aug. 25, 2005), pp. 1-5.

Agarwal et al., "April: A Processor Architecture for Multiprocessing," Proceedings of the 17th Annual International Symposium on Computer Architecture, *IEEE*, pp. 104-114, (1990).

Beckerle, M.J., "Overview of the START (*T) multithreaded computer" (abstract only), Publication Date: Feb. 22-26, 1993.

Byrd et al., "Multithread Processor Architectures," *IEEE Spectrum*, 32(8):38-46, New York, Aug. 1995.

Chandranmenon, G.P., et al., "Trading Packet Headers for Packet Processing", *IEEE/ACM Transaction on Networking*, 4(2):141-152, Apr. 1996.

Chappell, et al., "Simultaneous Subordinate Microthreading (SSMT)", *IEEE*, 168-195 (1999).

*Dictionary of Computer Words: An A to Z Guide to Today's Computers, revised Edition*, Houghton Mifflin Company: Boston, Massachusetts, pp. 220, (1995).

*Digital Semiconductor 21140A PCI Fast Ethernet LAN Controller, Hardware Reference Manual*, Digital Equipment Corporation, pp. i-x, 1-1 through 1-5, 2-1 throught 2-12, 3-1 through 3-38, 4-31 through 5-2, 6-1 though 6-24, (Mar. 1998).

Doyle et al., *Microsoft Press Computer Dictionary*, 2nd ed., Microsoft Press, Redmond, Washington, USA, p. 326, (1994).

Farrens, et al., "Strategies for Achieving Improved Processor Throughput", *ACM*, p. 362-369 (1991).

Fillo et al., "The M-Machines Multicomputer," *IEEE Proceedings of MICRO-28*, pp. 146-156, (1995).

Frazier, Howard, "Gigabit Ethernet: From 100 to 1,000 Mbps", *IEEE Internet Computing*, pp. 24-31, (1999).

Frazier, Howard, "The 802.3z Gigabit Ethernet Standard", *IEEE Network*, pp. 6-7,(1998).

Giroux, N., et al., "Queuing and Scheduling: Quality of Service in ATM Networks, Chapter 5", *Quality of service in ATM Networks: State-of-the-Art Traffic Management*, pp. 96-121 (1998).

Gomez et al., "Efficient Multithreaded User-Space Transport for Network Computing: Design and Test of the TRAP Protocol," *Journal of Parallel and Distrubuted Computing, Academic Press, Duluth, Minnesota, USA, 40(1):103-117, Jan. 1997.

Govind, et al., "Performance modeling and architecture exploration of network processors", *Quantitative Evaluation of Systems*, abstract only (1 page), Sep. 2005.

Haug et al., "reconfigurable hardware as shared resource for parallel threads," *IEEE Symposium on FPGAs for Custom Computing Machines*, 2 pages, (1998).

Hauser et al., "Garp: a MIPS processor with a reconfigurable coprocessor," *Proceedings of the 5th Annual IEEE Symposium on Field-Programmable Custom Computing Machines*, pp. 12-21, (1997).

Hyde, R., "Overview of Memory Management," *Byte*, 13(4):219-225, (1988).

Ippoliti, A., et al., "Parallel Media Access Controller for Packet Communications at Gb/s Rates", *IEEE*, pp. 991-996, (1990).

Jenks, S., et al., "Nomadic Threads: A migrating multithread approach to remote memory accesses in multiprocessors" (abstract only), Publication Date: Oct. 20-23, 1996.

Kaiserswerth, M., "The Parallel Protocol Engine", *IEEE/ACM Transactions on Networking*, 1(6):650-663, Dec. 1993.

Khailany, B., et al., "Imagine: Media Processing with Streams," IEEE Micro, Mar.-Apr. 2001, pp. 35-46.

Leon-Garcia, A., *Communications Networks: Fundamental Concepts and Key Architectures*, McGraw-Hill Higher Education, Copyright 2000, pp. 195-198, 215-219, & 380-385.

Lim, A., et al., "Improving Performance of Adaptive Media Access Control Protocols for High-Density Wireless Networks", *Proceedings of the 1999 International Symposium on Parallel Architectures, Algorithms and Networks (ISPAN '99)*, pp. 316-321, Jun. 1999.

Litch et al., "StrongARMing Portable Communications," *IEEE Micro*, 18(2):48-55, Mar. 1998.

Mollenauer, J.F., et al., "An Efficient Media Access Control Protocol for Broadband Wireless Access Systems" *IEEE Standard, IEEE 802.16 Broadband Wireless Access Working Group*, 19 pages, Oct. 1999.

Ochletree, J.B., et al., "A comparison of fibre channel and 802 MAC services", *Proceedings of 18th Conference on Local Computer Networks*, abstract only, 1 page, Sep. 1993.

Schmidt et al., "The Performance of Alternative Threading Architectures for Parallel Communications Subsystems," Internet Document, *Online!*, Nov. 13, 1998, pp. 1-19.

Shaw, M.C., et al., *UNIX Internals: A Systems Operations Handbook*, Windcrest Books, pp. 30-37, 1987.

Thistle et al., "A Processor Architecture for Horizon," *IEEE Proc. Supercomputing '88*, pp. 35-41, Nov. 1988.

Todorova, P., et al., "Quality-of-Service-Oriented Media Access Control for Advanced Mobile Multimedia Satellite Systems", *Proceedings of the 36th Annual Hawaii International Conference on System Sciences (HICSS'03)*, 8 pages, Jan. 2003.

Tremblay et al., "A Three Dimensional Register File for Superscalar Processors," *IEEE Proceedings of the 28th Annual Hawaii International Conference on System Science*, pp. 191-201, (1995).

Trimberger et al, "A time-multiplexed FPGA," *Proceedings of the 5th Annual IEEE Symposium on Field-Programmable Custom Computing Machines*, pp. 22-28, (1997).

Turner et al., "Design of a High Performance Active Router," Internet Document, *Online!*, 20 pages, Mar. 18, 1999.

Vibhatavanij et al., "Simultaneous Multithreading-Based Routers," *Proceedings of the 2000 International Conference of Parallel Processing*, Toronto, Ontario, Canada, Aug. 21-24, 2000, pp. 362-369.

Vuppala, V., et al., "Layer-3 switching using virtual network ports", *IEEE Proc. Computer Communications and Networks*, pp. 642-648, 1999.

Wazlowski et al., "PRSIM-II computer and architecture," *IEEE Proceedings, Workshops on FPGAs for Custom Computing Machines*, pp. 9-16, (1993).

Wikipedia entry, "Media Access Control", retrieved from http://en.wikipedia.org/wiki/Media_access_control, 2 pages, Jul. 31, 2007.

U.S. Appl. No. 09/473,571, filed Dec. 28, 1999, Wolrich et al.
U.S. Appl. No. 09/475,614, filed Dec. 30, 1999, Wolrich et al.

* cited by examiner

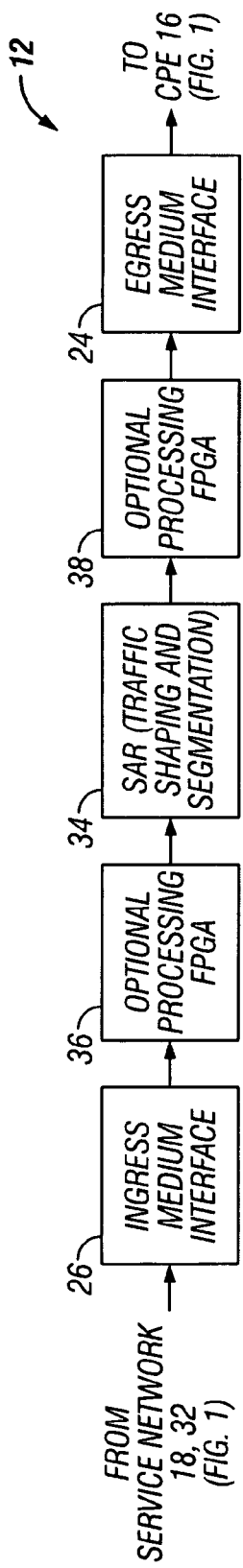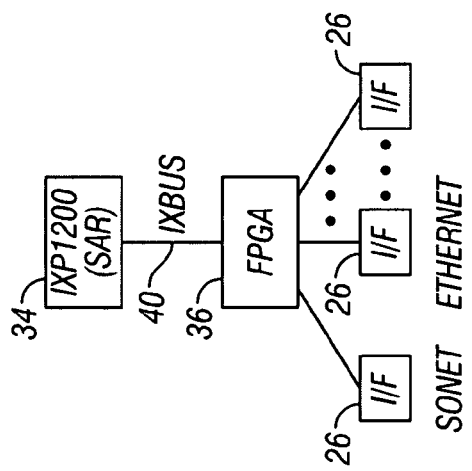

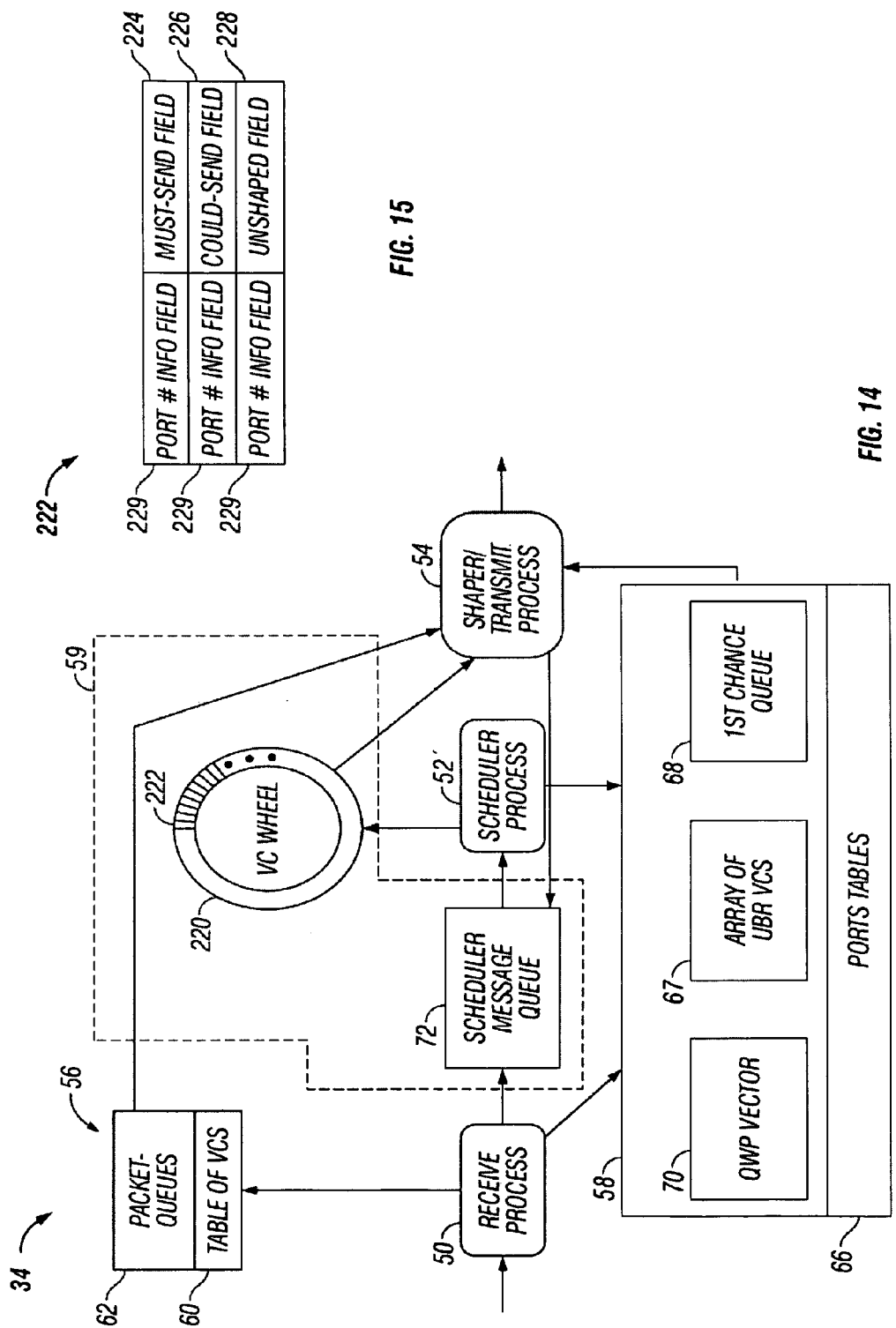

SCHEDULING SYSTEM FOR TRANSMISSION OF CELLS TO ATM VIRTUAL CIRCUITS AND DSL PORTS

BACKGROUND

The invention relates generally to networking, and more particularly to cell-based transmission scheduling for virtual circuits.

In complex networks, cells are transmitted to physical channels (or "ports") over a virtual circuit according to traffic parameters of the virtual circuit. One example of such traffic parameters are those specified in the "The ATM Forum Technical Committee Traffic Management Specification Version 4.1", The ATM Forum, March 1999. An ATM virtual circuit connection may characterize its traffic by using source traffic descriptions, which attempt to capture the cell inter-arrival pattern for resource allocation. Once such traffic descriptor is Peak Cell Rate (PCR), which represents the minimum spacing between cells, and therefore the peak emission rate of the source. The PCR is expressed in cell/seconds.

ATM supports a quality of service required by an application through the selection of an appropriate service category. The services offer different QoS commitments in terms of delay and loss tolerance. The services differ in how the network allocates bandwidth and applies different traffic management functions. The service categories include constant bit rate (CBR), variable bit rate (VBR) and unspecified bit rate (UBR). For CBR and VBR, bandwidth is allocated for the duration of the connection. In contrast, UBR services target for use bandwidth that becomes dynamically available as connections go idle.

The CBR service provides a connection with dedicated bandwidth providing extremely low probability of cell loss, as well as low and predictable delay. The inter-arrival time between two cells is constant and can be characterized as a minimum cell inter-arrival, which corresponds to a known PCR.

The VBR service category is mainly intended for more efficient support of applications that have known or predictable bursty traffic characteristics. The VBR traffic can be characterized by a sustained cell rate (SCR) as well as a PCR. The SCR is measured over a defined period and represents the average transmission rate. The VBR service can be further divided into two subcategories based on delay requirements, the real-time VBR (rt-VBR) and non-real-time VBR (nrt-VBR). The rt-VBR has strict end-to-end delay requirements, whereas the nrt-VBR does not guarantee any delay bounds.

A UBR virtual circuit can have a priority determined by the weight associated with such VC on a given port.

Ports can be characterized in terms of the maximum rates at which they are capable of transmitting.

DESCRIPTION OF DRAWINGS

FIG. 2 is a block diagram of DSLAM, including a Segmentation and Re-assembly device ("SAR").

FIG. 3 is a block diagram illustrating one embodiment of the DSLAM based on a network processor architecture.

FIG. 14 is a detailed block diagram of an alternative embodiment of the SAR device (of FIG. 2).

FIG. 15 is a depiction of the field format of an entry in a circular buffer that maintains schedules for shaped and unshaped traffic in the SAR device of FIG. 14.

DETAILED DESCRIPTION

Figure 1:
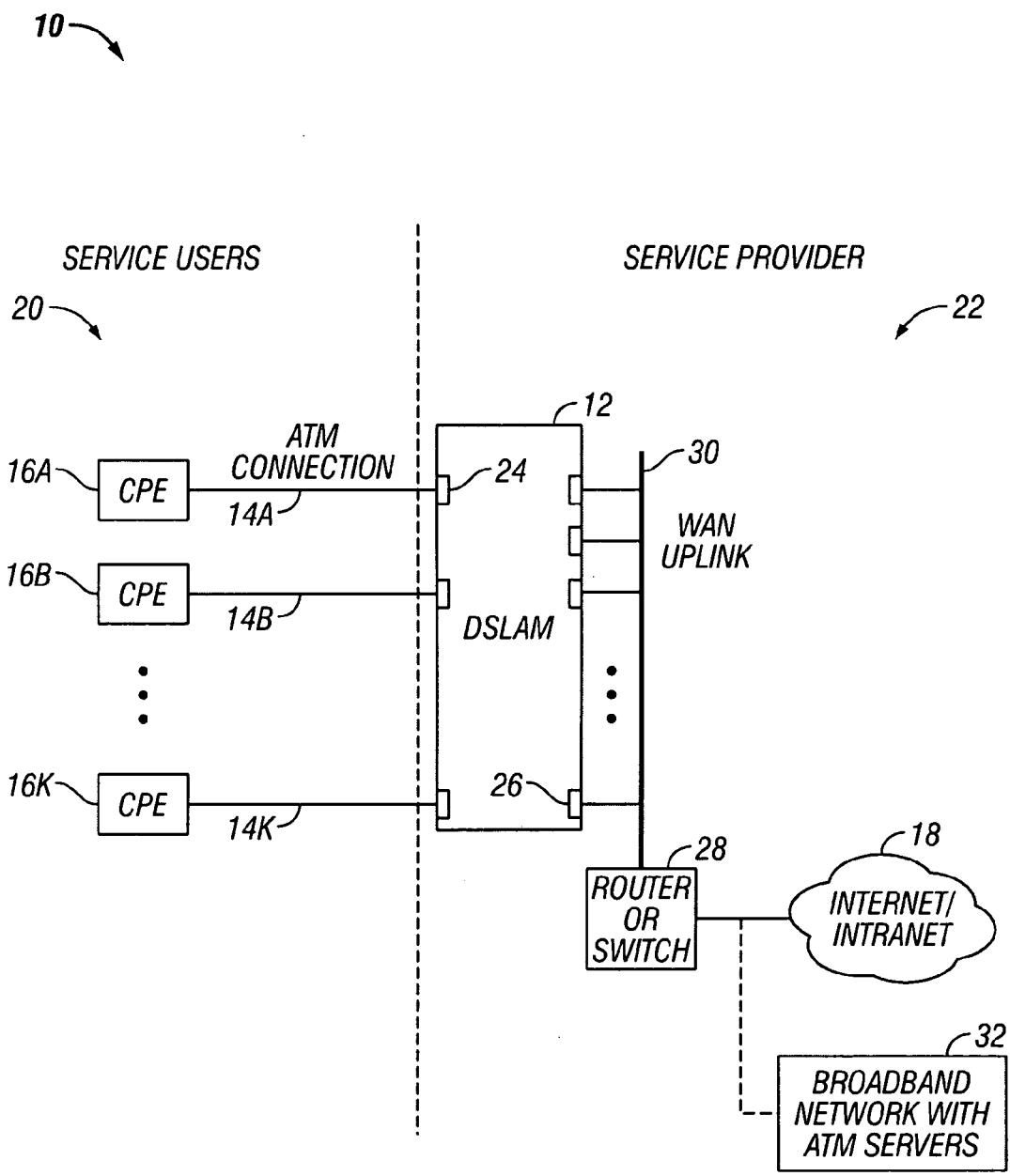
FIG. 1 is block diagram of a network environment that includes a Digital Subscriber Loop Access Multiplexer (DSLAM).

FIG. 1 shows a DSL network environment 10 that includes a DSL aggregation device 12, shown as a Digital Subscriber Loop Access Multiplexer (DSLAM), which concentrates connections 14a, 14b, ..., 14k, from DSL access points 16a, 16b, ..., 16k, for access to a service network such as the public Internet (or a corporate Intranet) 18. The DSL network environment 10 may be viewed in two parts: a customer or service user environment 20 and a service provider environment 22. In the customer environment 20, the DSL access points 16 typically correspond to Customer Premises Equipment (CPE). The CPE can take a variety of different forms, e.g., a DSL modem used by a home consumer, or a Small Office/Home Office (SOHO) router, and so forth. The connections 14 between the CPE 16 and the DSLAM 12 are usually ATM connections. The DSLAM 12 can be deployed in the service provider environment 22, as shown.

The DSLAM 12 can be characterized as having a CPE side with first port interfaces 24 for handling ATM cell-based traffic associated with corresponding DSL links or connections 14, and one or more second port interfaces 26, which are coupled to a router (or ATM switch) 28 via a WAN uplink connection 30. The router/switch 28 connects to a service network, such as the Internet 18, as indicated earlier, or some other type of service network, for example, an ATM network 32. Thus, for upstream traffic, many DSL ports on the CPE side may be aggregated at the DSLAM 12 and, on the service provider side, connected to the service network router with a single physical port interface.

For each port, there may be many virtual connections. The virtual connections represent "state full" communication setups, such as an ATM virtual circuit or Internet TCP connection. At each end of the network virtual connection is an application that can send and receive messages. The messages are carried across the network as packets or frames, which are further subdivided into 48 byte ATM cells. The interface into and out of the DSLAM 12 is either cell-based (48 byte ATM cells) or packet (or segment) -based (64 byte packet or greater sized segments based on the MTU on port interfaces 26). In the embodiment shown, the first port interfaces 24 are cell-based and the second port interfaces 26 handle frames (or packets). Each virtual connection has a quality of service or rate specification. In the described embodiment, the types of rates include constant bit rate (CBR), real-time and non-real-time variable bit rate (rt-VBR and nrt-VBR, respectively) and unspecified bit rate (UBR). A priority may be associated with a VC that contracts with the UBR service.

Referring to FIG. 2, a depiction of the DSLAM 12 for handling traffic from the service network 18 (or 32) to one of the CPEs 16 (that is, traffic flowing in the downstream direction) is shown. The DSLAM 12 therefore includes at least one of the second port interfaces 26, shown as an ingress medium interface, and at least one of the first port interfaces 24, shown as an egress medium interface. The interface 26 receives the downstream traffic from a service network, such as network 18, and provides that packet-based traffic to a Segmentation and Reassembly unit (SAR) 34. The SAR 24 segments packets into ATM cells, which are transmitted to a CPE over a medium via the egress medium interface 24. The SAR 34 also performs traffic scheduling and shaping, as will be described. The DSLAM 12 could further include logic to perform optional pre-SAR processing (e.g., packet formatting, aggregation of and interface to different media interfaces 26) and post-SAR processing (e.g., interface and MUX to different media interfaces 24). The logic could be implemented in software or hardware, e.g., in Field Programmable Gate Arrays (FPGAs) 36, 38, as shown. Thus, the logic 36 and 38 removes from the SAR 34 any complexity related to specific media interfaces and connects to the SAR 34 with a single bus that is compatible with the SAR architecture. The bus communication between the SAR and external processing logic 36, 38 is therefore purely concerned with satisfying the particular handshaking signals required by that bus.

The SAR 34 may be implemented with a commercially available network processor, for example, the Intel® IXP™ 1200 network processor. In such an embodiment, as shown in FIG. 3, the SAR 34 may be coupled to each FPGA via the Interface Exchange (IX) Bus. In this or other network processor architecture implementations, the bus could be some other bus suitable for connecting the SAR 34 to a medium interface or optional processing logic. Specifically, FIG. 3 illustrates the SAR 34, along with the DSLAM unit's pre-SAR cell-based processing FPGA 38 and a plurality of ingress medium interfaces 26. The interfaces 26 can be implemented to handle different types of connectivity and medium access protocols.

Figure 4:
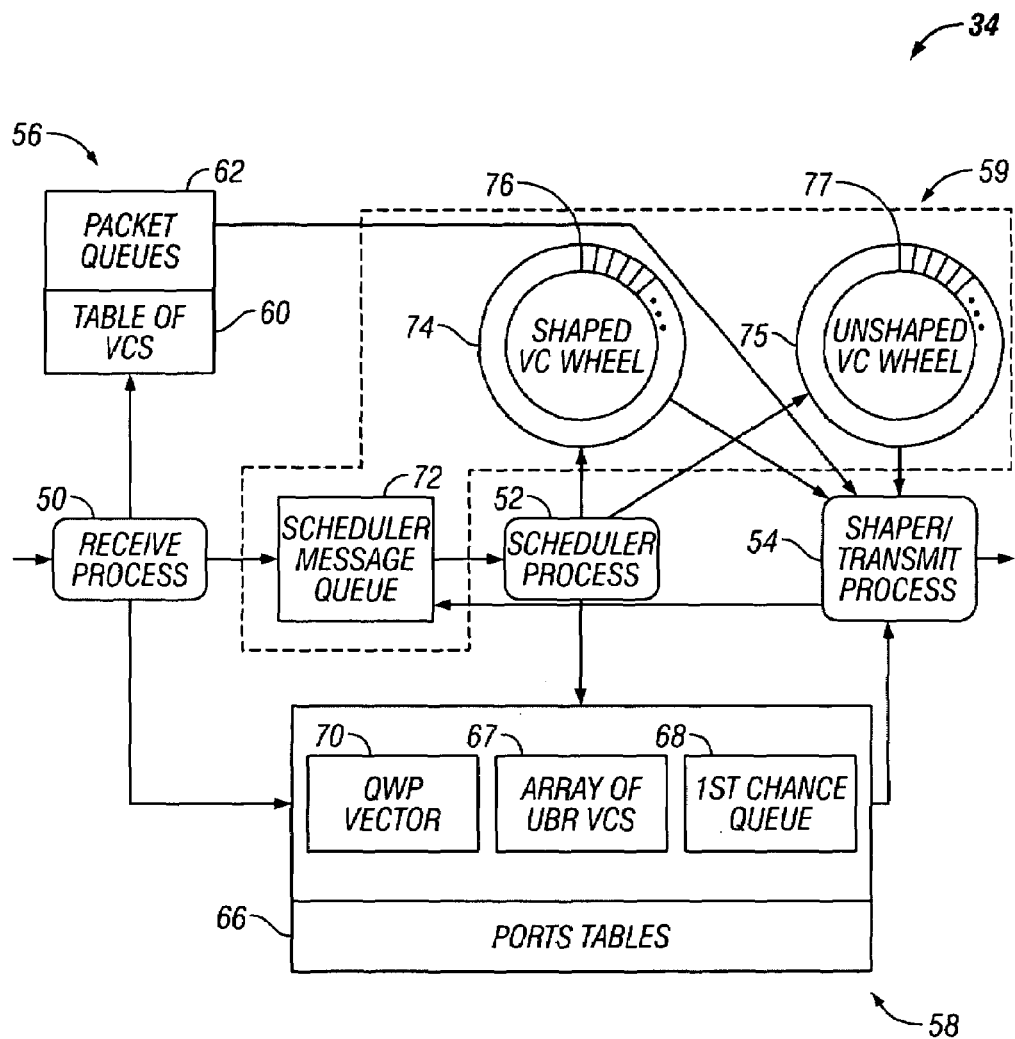
FIG. 4 is a detailed block diagram of the SAR device (of FIG. 2).

Referring now to FIG. 4, the SAR 34 includes processes and control structures for a concurrent shaped and unshaped traffic scheduling system. It will be appreciated that the process and control structures illustrated in the figure are only those that pertain to processing of traffic flowing in the downstream direction, that is, from service network to service user. All of these processes and structures reside on, and the processes are executed by, a processor such as a network processor, as discussed above with reference to FIG. 3. The processes include a receive process 50, a scheduler process 52 and a shaper/transmit process 54. The control structures include receive control structures 56, shaper/transmit control structures 58 and a scheduler control structure 59. The receive control structures 56 include the following: a VC table 60 and VC packet queues 62. The VC table 60 stores information associated with different VCs, such as pre-built ATM header, traffic parameters and state information (queue depth, thresholds, etc.) associated with VC queue and port destination information. The lookup table 60 is indexed by values that correspond to VCI/VPI information or, alternatively, for a table of reduced size, indexed by values generated by hashing VPI/VCI information. The VC packet queues 62 store incoming packets by the VCs associated with the packets. Thus, the VC packet queues 62 are organized by an identifier (such as the VCI) by which the associated VC can be determined. The index is used to determine the appropriate VC (or flow) entry in the VC table 60 to be read and the specific queue in which the incoming packet is to be stored.

The port specific control structures 58 include ports tables 66, an array of UBR VCs 67, a "first chance" queue 68 and a Queue With Packet (QWP) vector 70. The scheduler control structures 59 include a scheduler message queue 72, as well as a shaped VC control structure 74 and an unshaped VC control structure 75. In the illustrated embodiment, the VC control structures 74 and 75 are implemented as calendar-queues, and are thus depicted conceptually and referred to hereinafter as "wheels".

The scheduler message queue 72 stores schedule requests generated by the receive process 50 or shaper process 54, and is read by the scheduler process 52. The requests are cell transmission scheduling requests, which are VC-specific, and are therefore associated with one of the service types, that is, CBR, rt-VBR, nrt-VBR or UBR. The shaped VC wheel 74 and the unshaped VC wheel 75 hold current schedules. More specifically, the shaped VC wheel 74 is used to schedule CBR and rt-VBR VCs and, at times, nrt-VBR VCs (to meet SCR) as well, whereas the unshaped VC wheel 75 is used to schedule nrt-VBRVCs (with the aforementioned exception) and UBR VCs and, at times (e.g., to accommodate schedules to be added when a port goes from a flow-control asserted to de-asserted state), CBR and rt-VBR VCs as well, as will be explained in further detail later. The wheels 74, 75 are implemented as an array of time slots, the wheel 74 including slots 76 and the wheel 75 including slots 77, and the slots 76, 77 correspond to the maximum transmit rate of the network processor. Each slot represents a time slot in which an ATM cell can be transmitted.

The number of slots in the wheels is a function of aggregate port bandwidth. For example, for an aggregate bandwidth of 622 Mb/s, say, the smallest granularity of bandwidth that can be supported on any port is 9.6 Kb, which means that the wheels would be partitioned into 64 k locations or slots.

Cell transmit rate refers to the spacing between cell transmits to the network by the shaper/transmit process 54. The shaped wheel 74 is operated in absolute time. It steps every n cycles regardless of whether there are any cells to be transmitted. The timing of the unshaped wheel 76 is relative (with a current shaped wheel slot index), as will be described. It advances only when the shaped wheel has no cell to be transmitted in the current time slot.

A VC index associated with a virtual connection is stored in a particular one of the slots 76, 77, during scheduling. The VC may have a traffic parameter that requires it to be serviced at least at a predetermined rate. For example, a CBR VC must conform to a PCR specified for that VC. An rt-VBR must conform to PCR, SCR and Maximum Burst Size (MBS) parameters specified for that VC. Both CBR and rt-VBR will need to conform to the maximum cell transfer delay (max-CTD) as a measure of service quality. Cell Delay Variable Tolerance (CDVT) is used as a measure of time to compensate for jitter introduced due to the scheduling inefficiency.

The ports have data rates that can be measured and constrained. Like the PCR/SCR rate (bandwidth) associated with VCs, the rate of a port is converted from bits/sec to number of time slots determined by the port's inter-cell gap: more time slots yield a smaller rate. The conversion takes into account the network processors clock frequency and the clock cycle budget to process a single cell based on the aggregate bandwidth (sum of bandwidth of all ports).

One constraint consideration when configuring ports is the rates of VCs allocated to a port. Allocation is limited such that the sum of the minimum service rates for VC does not exceed the desired rate of the port. This ensures that all VCs on a given port can be serviced to their minimum rates.

The VC is scheduled into a wheel with sufficient spacing for transmission with sufficiency frequency to ensure that the transmission rate conforms to both the VC cell transmit rate and the port transmit rate.

The QWP vector 70 is a bit vector in which one bit position corresponds to the first chance queue 68 and 16 bit positions correspond to UBR VCs associated with a port. The array of UBR VCs 67 includes up to 16 entries, and each entry's priority is determined by the weight associated with it. Each array element is associated with a VC by a value indicating the VC index of that VC and contains the Weighted Round Robin (WRR) parameters.

If a bit position in the QWP vector has a value of one, either the first-chance queue or one of the 16 VCs has data awaiting transmission. When queuing packets in the VC queues associated with a VC that is either a UBR or a nrt-VBR VC that does not conform to SCR, the receive process 50 sets the corresponding bit in the QWP vector to one. When the transmit process 54 empties the VC queue queue (corresponding to the VBR-nrt or UBR), it sets the corresponding bit to zero.

The per-VC packet queues 62 include linked list queues, each associated with some VC. Given a VC index, the transmit process 54 can go to the associated per-VC packet queue 62 to get packet descriptor information and locate the corresponding packets. The transmit process 54 performs segmentation (that is, segments the packets into ATM cells) according to well-known SAR techniques.

As indicated earlier, the wheel slots represent processor time slots. Shaped wheel slots 76 reference VCs having "shaped" service rates CBR and rt-VBR, or sometimes SCR-conforming nrt-VBR. The allocation of the slots 76 to VCs provides a schedule for regular service to those VCs. Unshaped wheel slots 77 typically reference VCs having "unshaped" service rates nrt-VBR (PCR conforming) or UBR, but, as mentioned above, may also reference VCs having CBR and rt-VBR service rates.

Figure 5:
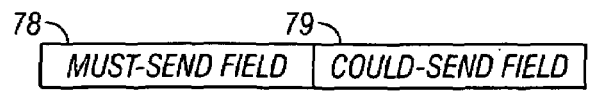
FIG. 5 is a depiction of the field format of an entry in a circular buffer that maintains schedules for shaped traffic ("shaped wheel").

The slots 76 of the shaped wheel 74 each reference VCs from two grades of service rates. FIG. 5 illustrates the format of the shaped wheel slot 76, which includes a must-send VC index field 78 corresponding to a first service rate ("must send" service rate) grade and a could-send VC index field 79 corresponding to a second service rate ("could send" service rate) grade. These fields 78, 79 reference virtual circuits characterized by the "must send" and "could send" grades of service rate, respectively. A "must-send" grade indicates VCs satisfying PCR for CBR VCs or SCR for VBR VCs. The "could-send" grade indicates VCs being opportunistic as in the case of rt-VBR VCs satisfying PCR, but of a lower priority than must-send.

In filling slots in the wheels, the scheduler 52 must ensure that the VC cell rate obeys the VC traffic parameters but does not exceed the physical port rate, as will be described later with reference to FIGS. 7 and 8A-8B.

Virtual circuits are selected for transmission from the unshaped wheel 76 when must-send and could-send virtual VCs in the shaped wheel, which have a higher priority, have not been scheduled. Thus, the unshaped wheel 75 provides rate control for VCs that are prioritized behind VCs referenced by must-send 78 and could-send fields 79 on the shaped wheel slots.

Returning to FIG. 4, the port tables 66 each contain information used by the scheduler 52 in determining schedules. Each port table 66 contains entries for a given port. Each schedule type (must-send, could-send, unshaped) has a separate field that indicates when a VC of that type was last scheduled on that port. This ensures that VCs associated with different schedule types can be scheduled in a way that does not allow a VC of an unshaped schedule type to be scheduled ahead of a VC of a shaped schedule.

The first chance queue 68 stores references to VCs, in FIFO order. First chance queue 68 is used for traffic to be transmitted to a VC at the first opportunity, as will be described.

The shaping/transmit process 54 is a process that manages the contention of multiple VCs, having various service rates, for transmission. The shaping/transmit process 54 iterates over the slots of the wheels to select VCs for transmission. In general, the shaping/transmit process 54 determines how time slots associated with the wheels 74, 75 will be used to transmit cells.

Further details of these control structures will be provided in the description of the operation of the SAR downstream processes 50, 52 and 54 to follow.

Incoming packets arrive and are stored in a receive buffer in main memory (not shown) pending transmission. Receive process 50 validate cells from the receive buffers and stages them by enqueuing the packets in the VC packet queues 62, pending transmission by the transmit process 54. The receive process 50 enqueues the packets based on the VC index of the VC with which each packet is associated. The transmit process 54 dequeues the packets from the VC packet queues 62, segments the packets into cells and transmits cells at specified cell rates appropriate to the VC and destination port, as will be explained. The VC index gives the position of the VC in VC table 60.

Figure 6:
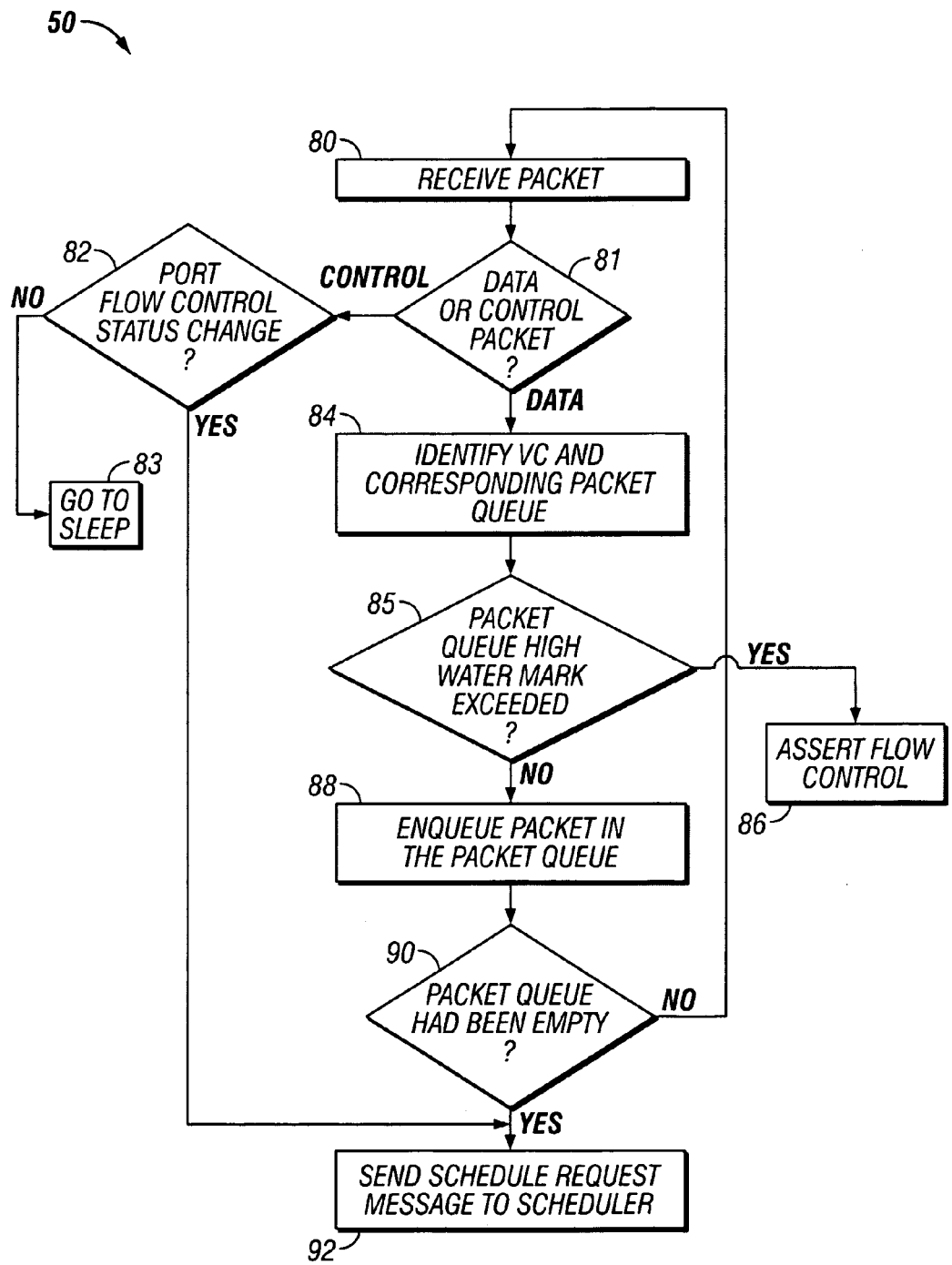
FIG. 6 is a flow diagram of a receive process used by SAR device.

Referring to FIG. 6, the receive process 50 receives 80 a downstream packet from the network 18 (via one of the interfaces 24 and logic 36, as discussed earlier). The receive process 50 determines 81 if the packet is a control packet or a data packet. If the packet is a control packet, the receive process 50 checks 82 for a change in port flow control status. If no change is detected, the receive process 50 goes to sleep (at 83). If, at 81, the packet is determined to be a data packet, the receive process 50 performs a lookup 84 in the VC lookup table 60 for the received packet to associate that packet with a VC and uses the VC to locate a corresponding one of the packet queues. Information about the VC, e.g., TM4.1 traffic management, current packet being assembled, etc., is kept at the table 60, in a specific VC entry. Alternatively, packet data can be received for other network protocols, such as Ethernet/IP, Frame Relay, etc., and a lookup is performed on the header to obtain an index to the VC in VC table 60. Once the VC and a corresponding packet queue are identified, the receive process 50 determines 85 if a fullness threshold is exceeded for the VC packet queue. If so, the process 50 asserts 86 a flow control signal to the FPGA 36 to push the congestion towards the upstream edge of the DSLAM or move it outside the DSLAM. Otherwise, the process 50 enqueues 88 the packet in the VC packet queue. The process 50 determines 90 if the VC packet queue, prior to receiving the current packet, had been empty. If it is determined that the VC packet queue had been empty, or a change in the port flow control status is detected at 82, the receive process 50 sends 92 a schedule request message to the scheduler 52. If the VC packet queue had not been empty prior to the queuing of the current packet, then the process continues processing incoming packets at 80.

In the described embodiment, to send a message to the scheduler 52, the receive process 50 stores a schedule request in the message queue 72. This is done only when the VC packet queue transitions from an empty to non-empty state as a result of a new packet being stored in that VC packet queue, as discussed above. The scheduler 52 does not look for work in the VC packet queue. It waits to be told (via the enqueuing of a scheduler request) that there is work to do for a particular VC. This is a work conserving property of the scheduler 52. The message queue 72 is also used for any work-related messages by the shaper 54 for the scheduler 52.

In particular, when queuing packets for CBR or VBR or UBR, the receive process 50 sends a message to the message queue 72 to request either a shaped scheduling (CBR, rt-VBR) or unshaped scheduling (UBR, nrt-VBR) for transmission.

Figure 7:
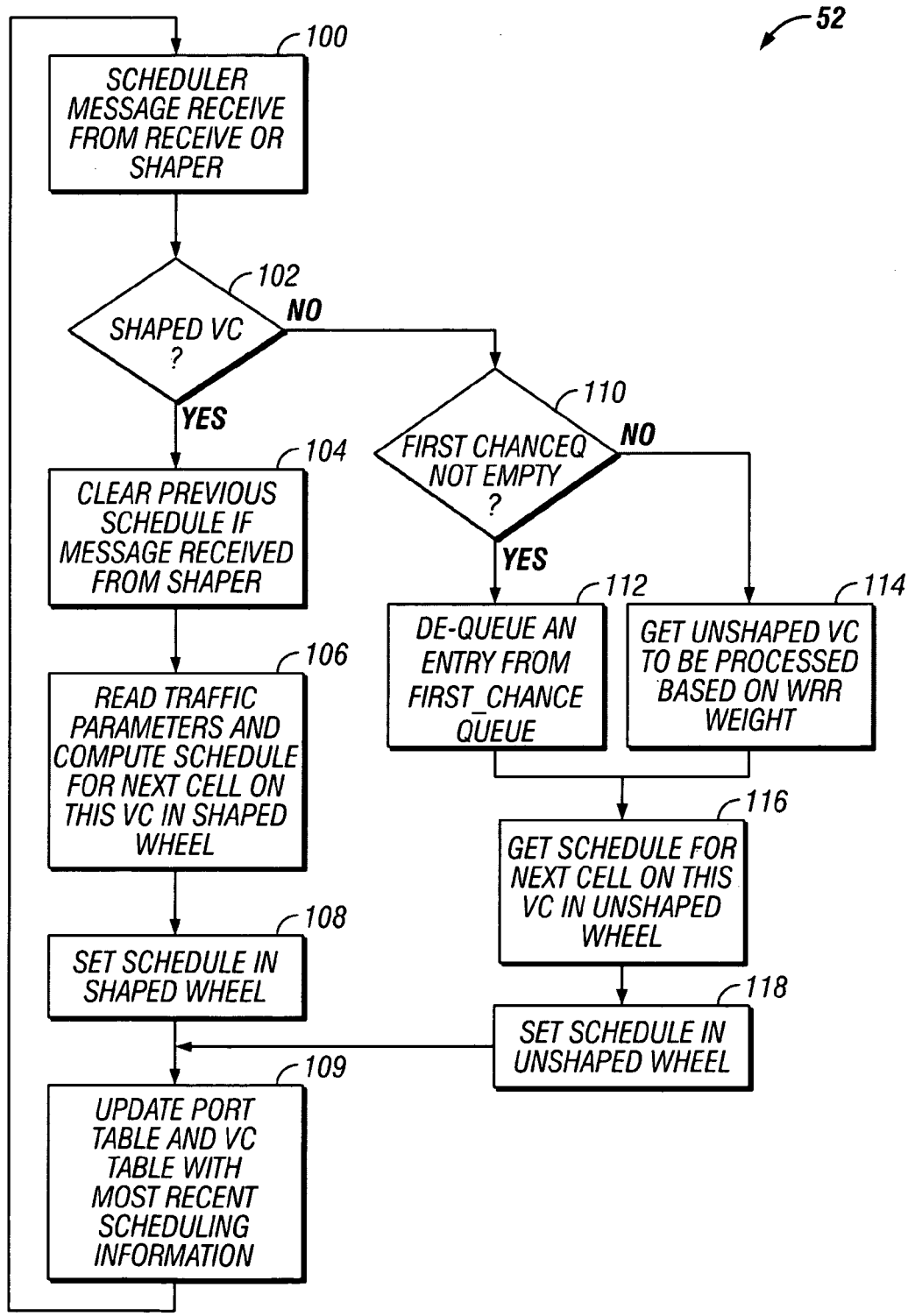
FIG. 7 is a flow diagram of a scheduler process used by the SAR device.

Referring to FIG. 7, the scheduler process 52 retrieves 100 from the message queue 72 a next scheduling request in the message queue 72. The scheduler process 52 determines 102 if the request is for a "shaped" VC, that is, for a VC having a traffic parameter that requires traffic shaping, such as CBR or rt-VBR (or even nrt-VBR, in order to meet an SCR contract). If so, the scheduler process 52 clears 104 the previous schedule if the message originated from the shaper 54. If the VC is shaped and the message is from the receive process, the scheduler process 52 reads 106 traffic parameters (from the VC table 60) and computes a schedule for a next cell on the VC in the shaped wheel. The scheduler 52 sets 108 the schedule in the shaped wheel. The scheduler 52 updates 109 the appropriate port table and VC table with the most recent scheduling information and returns to 100 to process the next received message.

If, at 102, the VC is determined to be an unshaped VC, and the scheduler 52 determines 110 that the first chance queue is not empty, the scheduler 52 de-queues 112 an entry from the first chance queue. If, at 110, the scheduler determines that the first chance queue is empty, the scheduler determines an unshaped VC to be processed based on a WRR weight 114. The first chance queue is checked on packet boundaries (as opposed to cell boundaries).

The simple case of the WRR is the round robin. If there are N connections, each separately queued, the RR mechanism in each cycle visits each of the queues and servers a cell if any is waiting. Thus, the RR mechanism shares the link bandwidth equally among all of the queues. Instead of an equal share, a weighted share per queue is also possible by assigning weights to each queue and giving slots proportional to the weight in each cycle.

Thus, when the scheduler 52 considers virtual circuits of an nrt-VBR or a UBR type, it uses the Queue With Packets bit vector 70 to check if the bit corresponding to the first-chance queue is set. If it is not set, the scheduler 52 uses the WRR algorithm to find the next UBR VC in the array of UBR VCs 67 that has data to transmit.

The scheduler determines 116 the schedule for the next cell on this VC in the unshaped wheel. The scheduler 52 sets 118 the schedule in the unshaped wheel by storing the VC index in the appropriate slot. The scheduler 52 updates 109 the appropriate port table and VC table with the most recent scheduling information and returns to 100 to process the next received message.

Figure 8A:
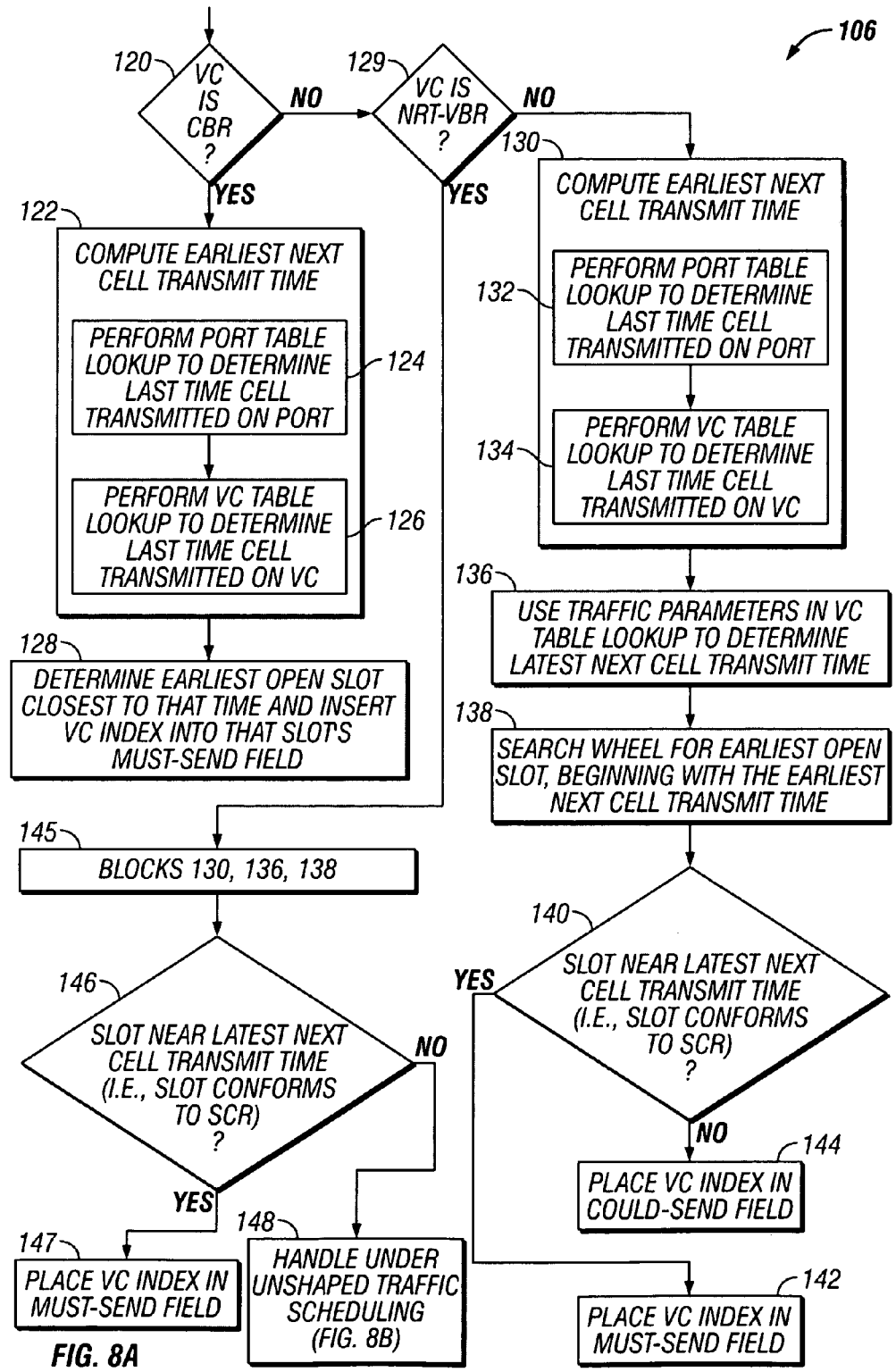
FIGS. 8A and 8B are flow diagrams of schedule determination processes for shaped traffic and unshaped traffic, respectively.

Referring to FIG. 8A, the shaped wheel schedule determination 106 is as follows. If, at 120, the VC is determined to be CBR, the scheduler process 52 computes 122 the earliest next time the cell can be sent by doing the following table lookups. It performs 124 a lookup of port information in the ports table 66 and uses that port information to determine the most recent time a cell (based on schedule type: must-send or could-send or unshaped) was scheduled for transmission on this port. It also performs a lookup 126 in the VC table 60 and uses that VC table lookup information to determine the last time a cell was last scheduled for transmission on this VC. The scheduler 52 inserts 128 the VC index (of the VC being scheduled) into the must-send side of a slot in the shaped wheel 74 that is as close as possible to that time. If, at 120, the scheduling request is determined to be non-CBR, the scheduler process 52 determines 129 if the VC is nrt-VBR. If the VC is determined not to be nrt-VBR (that is, it is rt-VBR), the scheduler process 52 determines 130 the earliest next transmit time (earliest slot time) by looking up 132 port information in ports table 66 to get the last time a cell was scheduled for transmission (based on schedule type:must-send or could-send or unshaped) on this port and by looking up 134 in the VC table 60 to get the last time a cell was scheduled for transmission on this VC, and finds 136 the latest time (using the traffic contract parameters) the next cell on this VC can be sent. The scheduler process 52 performs 138 a search of the shaped wheel 74 to find an open slot, starting with the earliest slot time. This may be accomplished by using hierarchical bit vectors of slots available information as a way of searching for an available slot to schedule. The scheduler process 52 determines 140 whether or not the slot found is near the latest time (that is, whether or not the slot conforms to SCR). If it is, the process 52 places 142 the VC index in the must-send field in that earliest open slot in the shaped wheel 74. If it is not, the process 52 places 144 the VC-index in the could-send field instead.

If, at 129, the VC is determined to be nrt-VBR, the scheduler process 52 performs 130, 136 and 138 (indicated collectively by reference numeral 145) as described above. The scheduler process 52 determines 146 if the slot found (at 145) is near the latest next cell transmit time (that is, if the slot conforms to SCR). If so, the scheduler process 52 places 147 the VC index in the must-send field in that earliest open slot of the shaped wheel 74. Otherwise, the scheduler process 52 handles the VC under unshaped traffic scheduling (discussed below with reference to FIG. 8B).

Figure 8B:
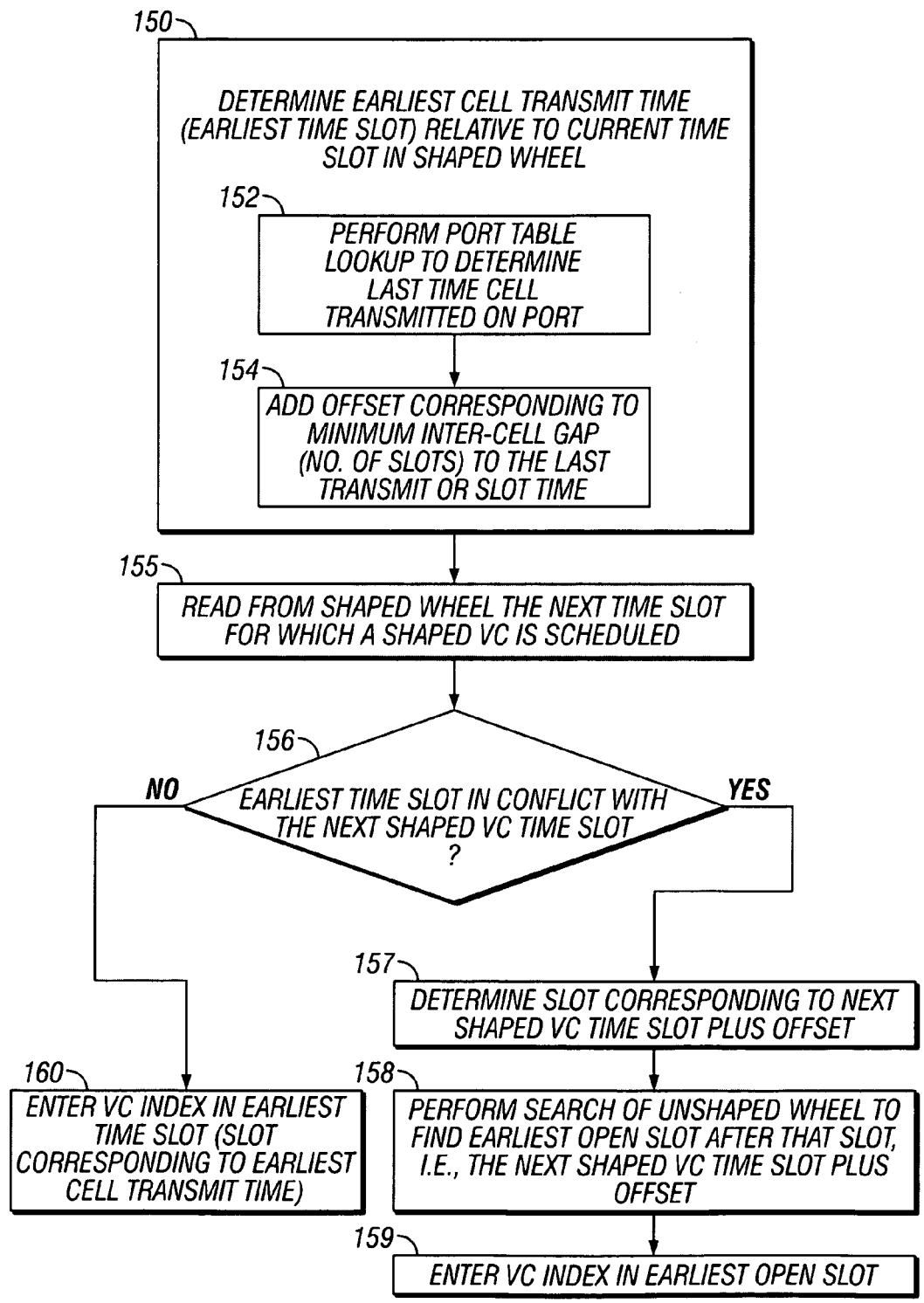

Referring to FIG. 8B, the schedule determination 116 is as follows. For a UBR scheduling request, an nrt-VBR scheduling request that could not be handled under shaped traffic scheduling or a first chance queue scheduling request, the scheduler process 52 determines 150 the earliest slot time this port could be transmitted to relative to the current time-slot being processed on the unshaped wheel 76 by performing 152 a lookup of port information in the ports table 66 to find the last time a cell was schedule for transmission (based on schedule type: must-send or could-send or unshaped) on this port, and adding 154 to that last time slot an offset corresponding to a minimum inter-cell gap (which is the minimum number of slot times between transmits to this port). It reads 155 the next time-slot a shaped VC (CBR or rt-VBR) is scheduled on the shaped wheel 74. If it determines 156 that the earliest slot time calculated above is in conflict with the next shaped VC slot, the scheduler process 52 determines 157 a slot corresponding to the next shaped VC time-slot plus the offset. The process 52 performs 158 a range search in the unshaped wheel 76 to find the earliest open slot after that time (that is, the shaped VC time-slot plus the offset), and enters 159 the VC index in that earliest open slot in the unshaped wheel 76. Otherwise, after 158, the process 52 enters 160 the VC index in the earliest time slot (the slot corresponding to the earliest cell transmit time).

Figure 9:
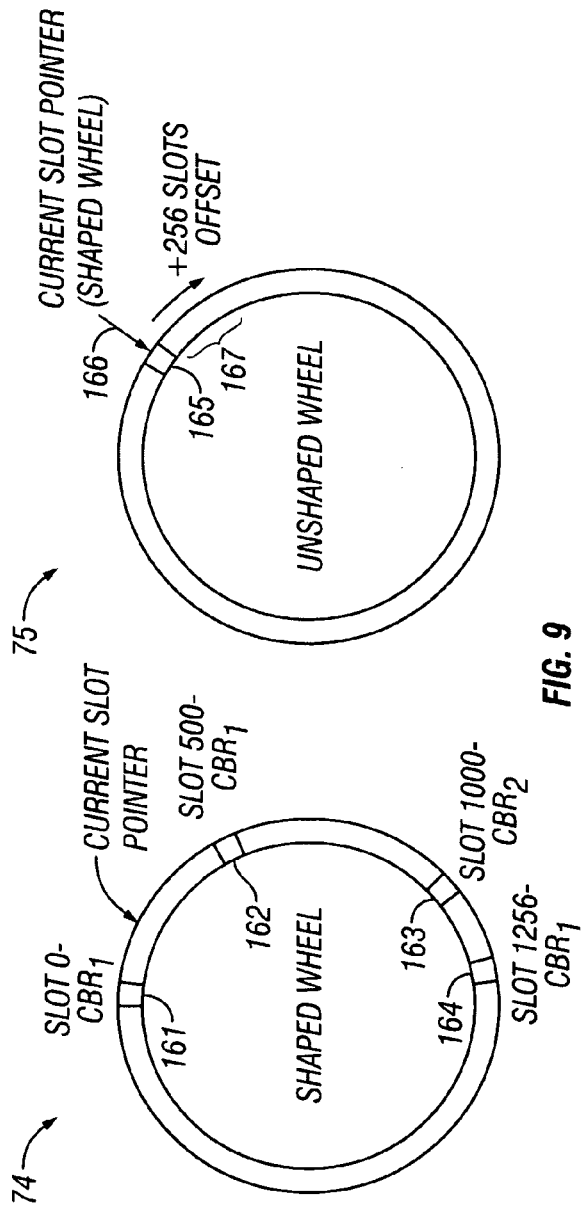
FIG. 9 is a depiction of exemplary circular buffers (or "wheels") for shaped and unshaped traffic.

FIG. 9 illustrates the timing relationship between the shaped wheel 74 and the unshaped wheel 75, and scheduling of the shaped wheel 74 for a simple example involving two CBR VCs. In the example, it is assumed that the maximum port transmit rate of a destination port "i" requires that one in every 256 slots be transmitted (or, in different terms, requires a minimum inter-cell spacing of 255 slots). A PCR of a first CBR VC (CBR1) to the destination port "i" requires that CBR1 transmits every 500 slots. The PCR of a second CBR VC (CBR2) requires that that VC transmits every 1000 slots. However, the scheduling of both of these shaped VCs must honor the port transmit rate. In the example, it is further assumed that a first CBR1 cell transmit is scheduled for slot 0 (indicated by reference numeral "161") and a second one for slot 500 (indicated by reference number "162") at time $t_0$. Also assumed is that a first cell transmit on CBR2 is scheduled for slot 1000 (reference number "163") at time $t_1$. The spacing between the schedules for any of these cell transmits is greater than the minimum port inter-cell spacing (255 slots) and is therefore allowable. Now consider that a new cell is to be scheduled for CBR1 at time $t_2$. That cell transmit cannot occupy slot 1001 because it would violate the required port rate inter-cell spacing. Thus, the earliest next slot that can be occupied by CB1 is slot 1256 (indicated by the reference number "164").

During scheduling on the unshaped wheel 75, the scheduler determines a slot 165 pointed to by the current slot pointer or index (pointer 166) on the shaped wheel and adds to that slot number at least an offset based on the minimum inter-cell gap or spacing, which is 255 in the running example, or offset 167.

Figure 10:
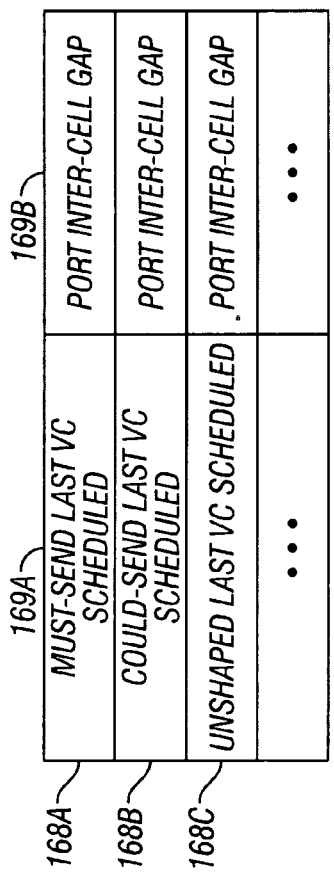
FIG. 10 is a depiction of an exemplary port table.

FIG. 10 illustrates an exemplary port table 66 for port "i" of the running example. As discussed earlier, the port table 66 includes entries 168 for each schedule type, entry 168*a* for the must-send schedule type, entry 168*b* for the could-send schedule type and entry 168*c* for the unshaped schedule type. Each entry includes a field 169*a* for indicating the last VC/cell transmission scheduled on the port and a second field 169*b* for indicating the port inter-cell gap. The scheduler 52 reads the entry of the appropriate schedule type for this VC to determine the last VC/cell transmission scheduled on this port and computes the next available slot based on the contents of the field 169*a* of that entry, the previous slot scheduled for this VC and the port inter-cell gap value. Because the port inter-cell gap value is the same for each of the entries, it could be stored in a single location. Storing it in each of the entries as illustrated, however, minimizes the number of reads performed by the scheduler 52. Thus, when looking to schedule CBR1 at $t_2$, the scheduler 52 determines that, based solely on the PCR, the next slot should be 1000, that the last cell scheduled for this port was scheduled for slot 1000 and, given the inter-cell spacing required by the port transmit rate, the next earliest slot is slot 1256.

The shaping process 54 selects VCs for transmission. It iterates over slots in the wheels, examines wheel slots/entries, and determines how the slots will be used to transmit data.

Figure 11:
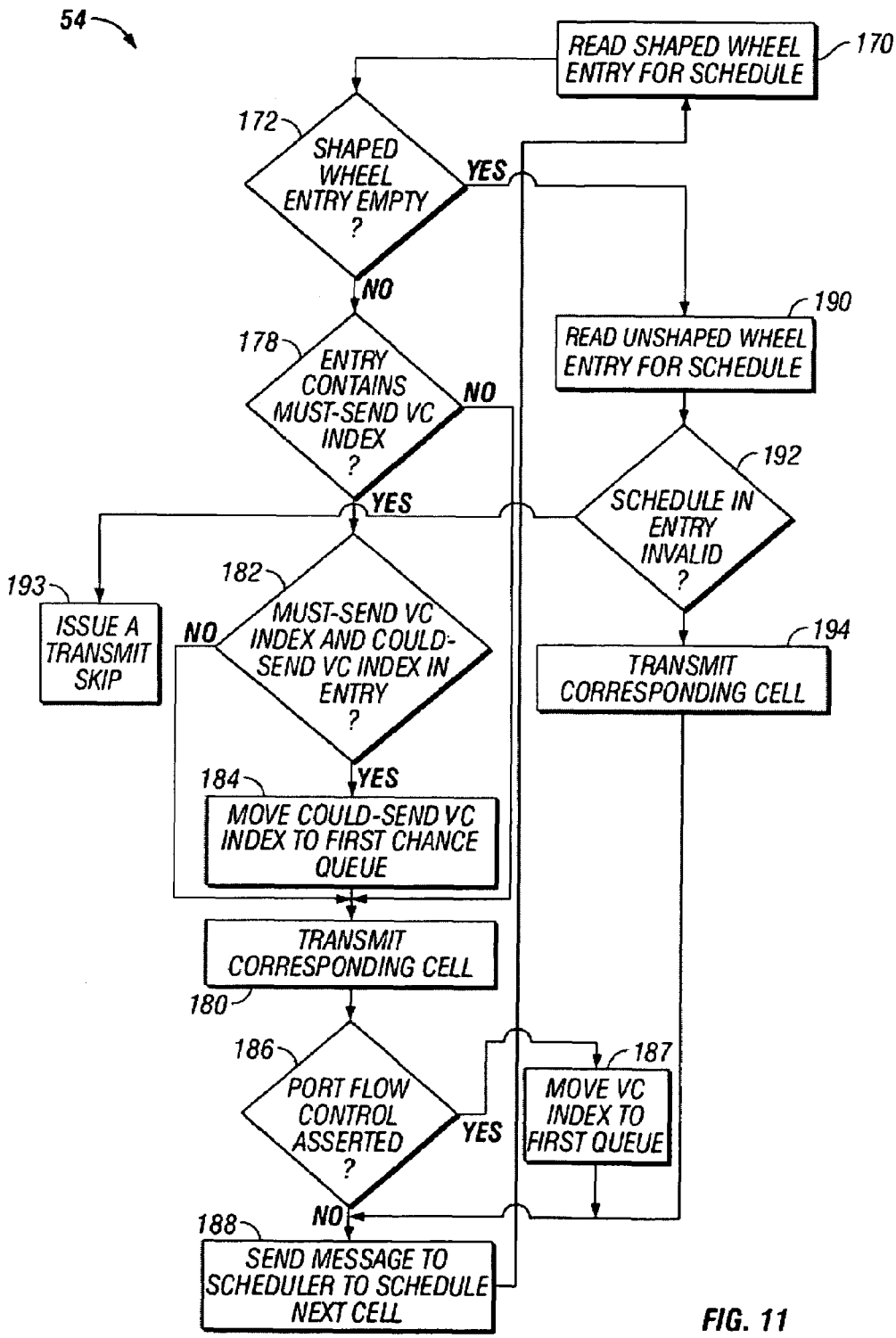
FIG. 11 is a flow diagram of a traffic shaping process used by the SAR device.

Referring to FIG. 11, the shaper/transmit process 54 reads 170 the shaped wheel 74 for the next slot to be sent. The process 54 determines 172 if the next slot entry is empty. If the process 54 determines 172 that the slot entry is not empty, the process determines 178 if a VC index is present in the must-send field. If the process determines, at 178, that a VC index is present in the could-send field only, the process 54 issues 180 a transmit command. If, at 178, it is determined that a VC index is present in the must-send field and it is further determined, at 182, that no VC index is present in the could-send field, the process 54 issues a transmit command 180 to transmit the corresponding cell. If, however, at 182, the process 54 determines that a must-send and could-send VC index are both present in that slot, the process 54 sends a message to the scheduler 52 to re-schedule the could-send VC index. The process 54 then issues 180 a transmit command to transmit the corresponding cell associated with the must-send VC. The process 54 determines 186 if port flow control is asserted. If it is, the process 54 moves 187 the VC index to the first chance queue. After the process 54 has moved the VC index to the first chance queue, or if (at 186) port flow control is determined to be de-asserted, the process 54 sends 188 a message to the scheduler (via the message queue) to schedule a next cell on that port (whose flow-control was de-asserted). If a valid schedule (VC index) is present, the process 54 issues 194 that VC for transmit and proceeds to 188.

Thus, the unshaped wheel 75 advances only when it has a cell to transmit. The shaped wheel 74 advances in all cases (that is, whether or not it has a cell to transmit).

The shaper/transmit process 54 reconverts the scheduled slot time to an actual hardware cycle time so that the cell is transmitted as close to the desired time (traffic management contracted time) as possible.

Figure 12:
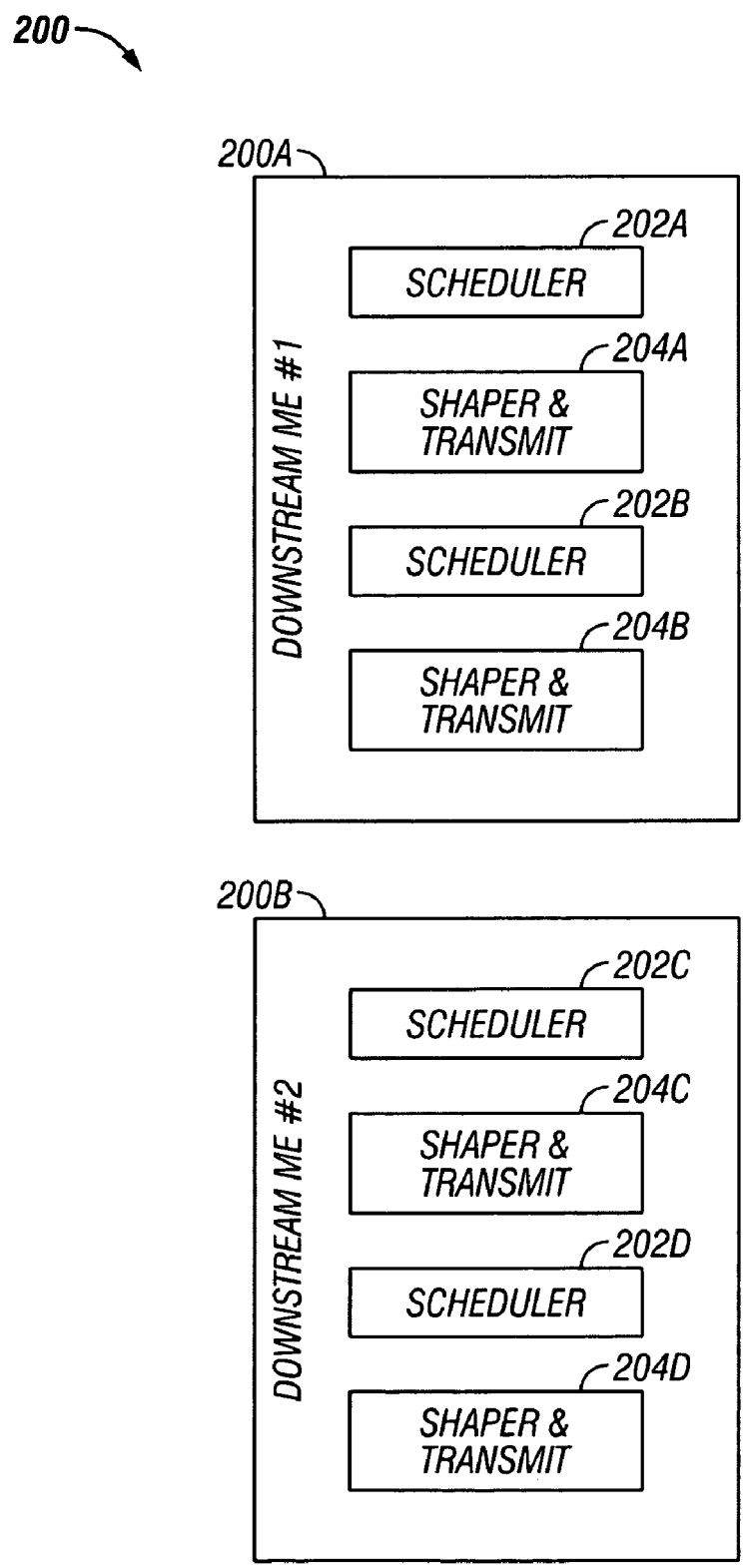
FIG. 12 is an exemplary multi-threaded microengine embodiment of the SAR traffic scheduler and shaping functions.

As discussed earlier, the scheduling/shaping algorithms can be implemented in a multiprocessor, multi-threaded architecture such as the Intel® IXP™ 1200. In one such embodiment, for example, and as shown in FIG. 12, microengines (ME) 200*a* and 200*b* each perform TM4.1 functions. Each ME 200 supports four threads, which are used to execute two schedulers and two shaper-transmit functions. That is, ME 200*a* includes schedulers 202*a* and 202*b*, and ME 200*b* includes schedulers 202*c* and 202*d*. The ME 200*a* includes shaper-transmit functions 204*a* and 204*b*, and ME 200*b* includes shaper-transmit functions 206*a* and 206*b*.

Figure 13:
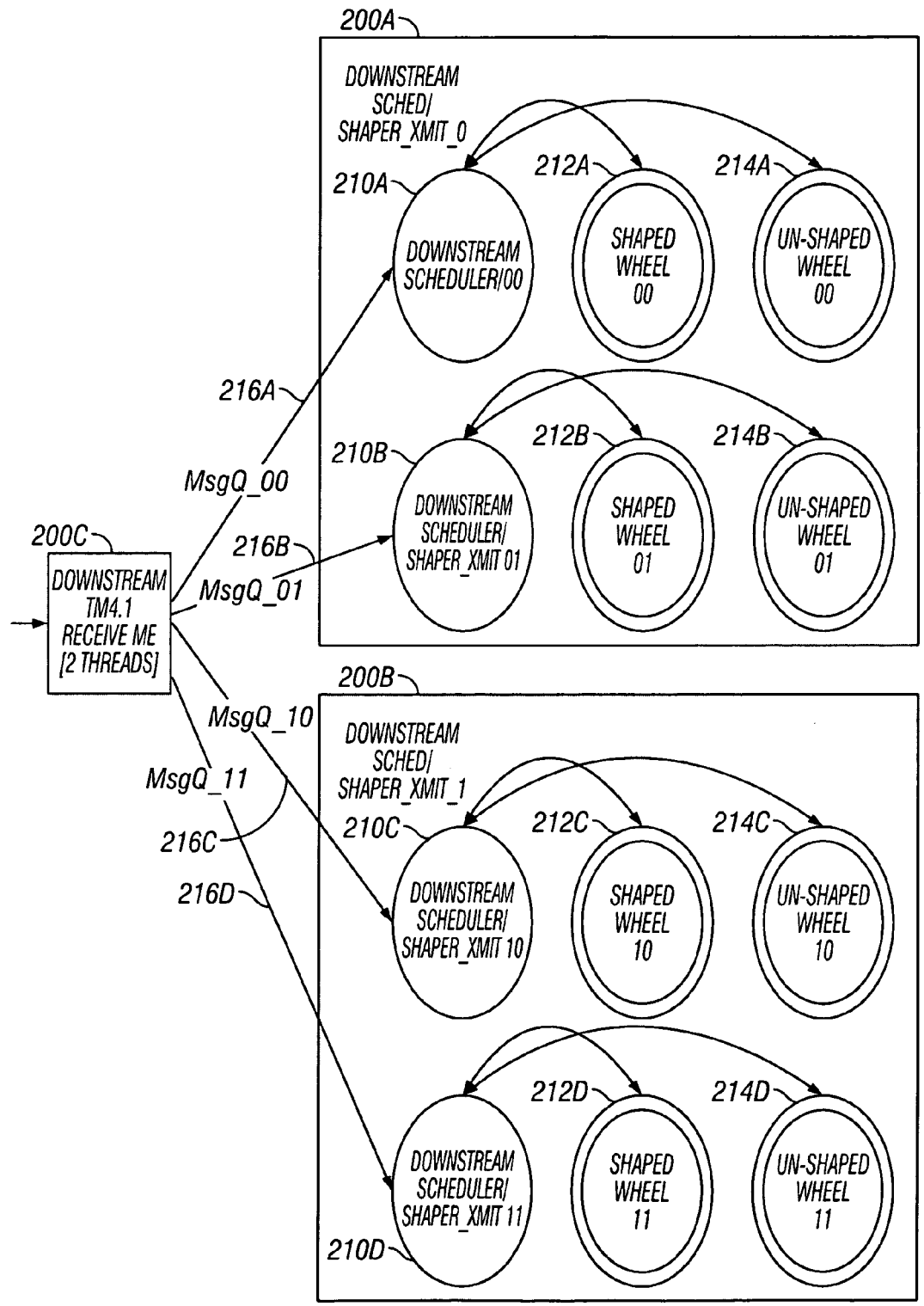
FIG. 13 is a depiction of the multi-threaded microengine embodiment of the receive, scheduler and traffic shaping functions in which the shaped and unshaped wheels each are partitioned into four separate wheels.

FIG. 13 shows a third ME 200*c* dedicated to the downstream receive process 50 (2 threads) and the two ME's 200*a*, 200*b* for the downstream TM4.1 scheduling, shaping and transmit functions (4 threads each). Scheduler and shaper-transmit threads are paired, for example, and as shown, thread pairs 210*a*, 210*b*, 210*c* and 210*d*. Such pairs 210 operate on a distinct shaped and unshaped wheel. For example, pair 210*a* operates on shaped wheel 212*a* and unshaped wheel 214*a*, pair 210*b* operates on shaped wheel 212*b* and unshaped wheel 214*b*, and so forth. This partitioning of the workload removes the need for mutual exclusion that would have been necessary if all the threads dedicated to perform scheduling/shaping/transmitting were not bound to process a sub-set of all DSL ports in the system. In this scheme, the ports are uniquely mapped to one of the four wheels, which means that all shaped or unshaped VCs belonging to a given port are assigned to one of shaped wheels [00-11]/unshaped wheels [00-11]. In this embodiment, there are four message queues (represented by arrows 216*a*-216*d*). They are mapped on a one-to-one basis from the message-producing receive threads to the message-consuming scheduler threads.

As discussed above, the scheduling of the SAR 34 is performed on an as-needed basis. The must-send/could-send slot scheme allows a CBR VC to be scheduled after a VBR VC on the shaped wheel, with the CBR taking priority. It also minimizes additional reads should the VBR schedule be stored in a separate wheel. The first chance queue allows a displaced VBR scheduled VC to be sent at the earliest opportunity for a port. The scheduling of unshaped VCs in a relative time wheel eliminates searching for a port that has data, and assures the port rate is not exceeded by maintaining that back-to-back cells are separated by an inter-cell minimum gap.

In another embodiment, as will be described with reference to FIGS. 14 through 18, the SAR device could maintain, and, consequently, the scheduling and shaping mechanisms could be implemented to use, a single VC control structure to manage schedules for both shaped and unshaped traffic. Such a structure would therefore replace the two VC control structures, that is, the VC control structure 74 for shaped traffic and the VC control structure 75 for unshaped traffic, discussed so far.

Referring to FIG. 14, a SAR that supports a single wheel, indicated as SAR 34', is shown. The SAR 34', like the SAR 34 of FIG. 4 described earlier, includes processes and control structures for a concurrent shaped and unshaped traffic scheduling system. The processes include the receive process 50, a scheduler process 52' and a shaper/transmit process 54'. The control structures include the receive control structures 56, the shaper/transmit control structures 58 and a scheduler control structure 59'.

The scheduler control structures 59' include the scheduler message queue 72, as well as a VC control structure 220. In the illustrated embodiment, the VC control structure 220 is implemented as a calendar queue ("wheel").

The VC wheel 220 hold current schedules. More specifically, the VC wheel 220 is used to schedule both shaped and unshaped traffic. The wheel 220 is implemented as an array of time slots, including slots 222, and the slots 222 correspond to the maximum transmit rate of the network processor. Each slot represents a time slot in which an ATM cell can be transmitted. The number of slots in the wheel is a function of aggregate port bandwidth. Cell transmit rate refers to the spacing between cell transmits to the network by the shaper/transmit process 54'. The wheel 220 is operated in absolute time. It steps every n cycles regardless of whether there are any cells to be transmitted.

A VC index associated with a virtual connection is stored in a particular one of the slots 222 during scheduling. The VC may have a traffic parameter that requires it to be serviced at least at a predetermined rate. For example, a CBR VC must conform to a PCR specified for that VC. An rt-VBR must conform to PCR, SCR and Maximum Burst Size (MBS) parameters specified for that VC. Both CBR and rt-VBR will need to conform to the maximum cell transfer delay (max-CTD) as a measure of service quality. Cell Delay Variable T (CDVT) is used as a measure of time to compensate for jitter introduced due to the scheduling inefficiency.

The VC is scheduled into the wheel 220 with sufficient spacing for transmission with sufficient frequency to ensure that the transmission rate conforms to both the VC cell transmit rate and the port transmit rate.

The slots 222 of the wheel 220 each reference VCs from two grades of service rates for shaped traffic, as well as unshaped VCs. FIG. 15 illustrates the format of the slot 222, which includes a must-send field 224 corresponding to a first service rate ("must send" service rate) grade and a could-send field 226 corresponding to a second service rate ("could send" service rate) grade. These fields are equivalent to 78, 79 in FIG. 5 that reference virtual circuits characterized by the "must send" and "could send" grades of service rate, respectively. A "must-send" grade indicates VCs satisfying PCR for CBR VCs or SCR for VBR VCs. The "could-send" grade indicates VCs being opportunistic as in the case of rt-VBR VCs satisfying PCR, but of a lower priority than must-send. A third field, unshaped (or "Best Effort") field 228, is used to schedule the unshaped traffic. When the "Best Effort" field 228 and at least one of the other two fields 224, 226 store scheduling information, the scheduling information in the Best Effort field 228 results in a re-schedule message being sent by the shaper 54' to the scheduler 52', as will be described. Thus, virtual circuits are selected for transmission from the Best Effort field 228 when must-send and could-send virtual VCs, which have a higher priority, have not been scheduled in the same slot. Thus, the Best Effort field 228 provides rate control for VCs that are prioritized behind VCs referenced by must-send 224 and could-send fields 226 in a given slot.

In one implementation, the slot is organized as three longwords (32 bits). Two longwords are used to hold the contents of fields 224 and 226 respectively. The other longword is used to hold the Best Effort information of the Best Effort field 228. Each longword has the capability to store the port number associated with the scheduled VC in a port number information field 229. If more than one of the fields 224, 226, and 228 are populated in a given slot and the VC selected for transmission is determined to be flow controlled, the port numbers could enable the shaper process 54' to determine in an efficient manner that another VC can be selected for transmission if the port numbers indicate that that VC and the originally selected VC are associated with different ports.

Returning to FIG. 14, the port tables 66 each contain information used by the scheduler 52' in determining schedules. Each port table 66 contains entries for a given port. The port table 66 is the same as was described earlier with reference to FIGS. 4 and 10.

The shaping/transmit process 54' is a process that manages the contention of multiple VCs, having various service rates, for transmission. The shaping/transmit process 54' iterates over the slots of the wheel 220 to select VCs for transmission. In general, the shaping/transmit process 54' determines how time slots 222 and fields within the time slots 222 will be used to transmit cells.

Further details of the wheel 220 will be provided in the description of the operation of the SAR downstream processes 52' and 54' to follow.

Figure 16:
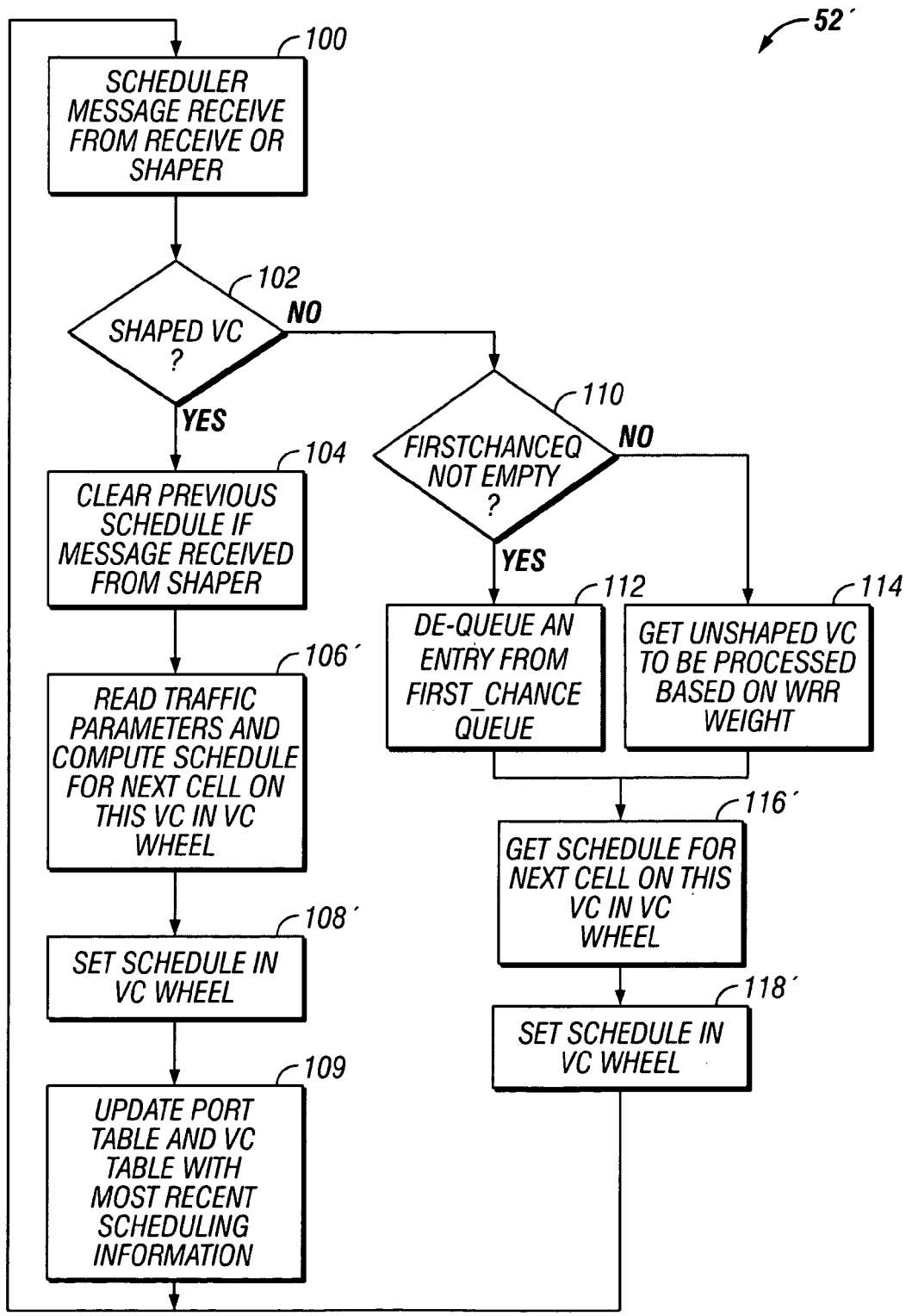
FIG. 16 is a flow diagram of a scheduler process used by the SAR device of FIG. 14.

Referring to FIG. 16, the scheduler process 52' retrieves 100 from the message queue 72 a next scheduling request in the message queue 72. The scheduler process 52' determines 102 if the request is for a "shaped" VC, that is, for a VC having a traffic parameter that requires traffic shaping, such as CBR or rt-VBR (or even nrt-VBR, in order to meet SCR contract). If so, the scheduler process 52' clears 104 the previous schedule if the message originated from the shaper 54'. If the VC is shaped, the scheduler process 52' reads 106' traffic parameters (from the VC table 60) and computes a schedule for a next cell on the VC in the wheel 220. The scheduler 52' sets 108' the schedule in the wheel 220. The scheduler 52' updates 109 the appropriate port table and VC table with the most recent scheduling information and returns to 100 to process the next received message.

If, at 102, the VC is determined to be an unshaped VC, and the scheduler 52' determines 110 that the first chance queue is not empty, the scheduler 52' de-queues 112 an entry from the first chance queue. If, at 110, the scheduler determines that the first chance queue is empty, the scheduler determines an unshaped VC to be processed based on a WRR weight 114. The first chance queue is checked on packet boundaries (as opposed to cell boundaries).

The scheduler determines 116' the schedule for the next cell on this VC in the wheel 220. The scheduler 52' sets 118' the schedule in the wheel 220 by storing the VC index in the appropriate slot.

Figure 17A:
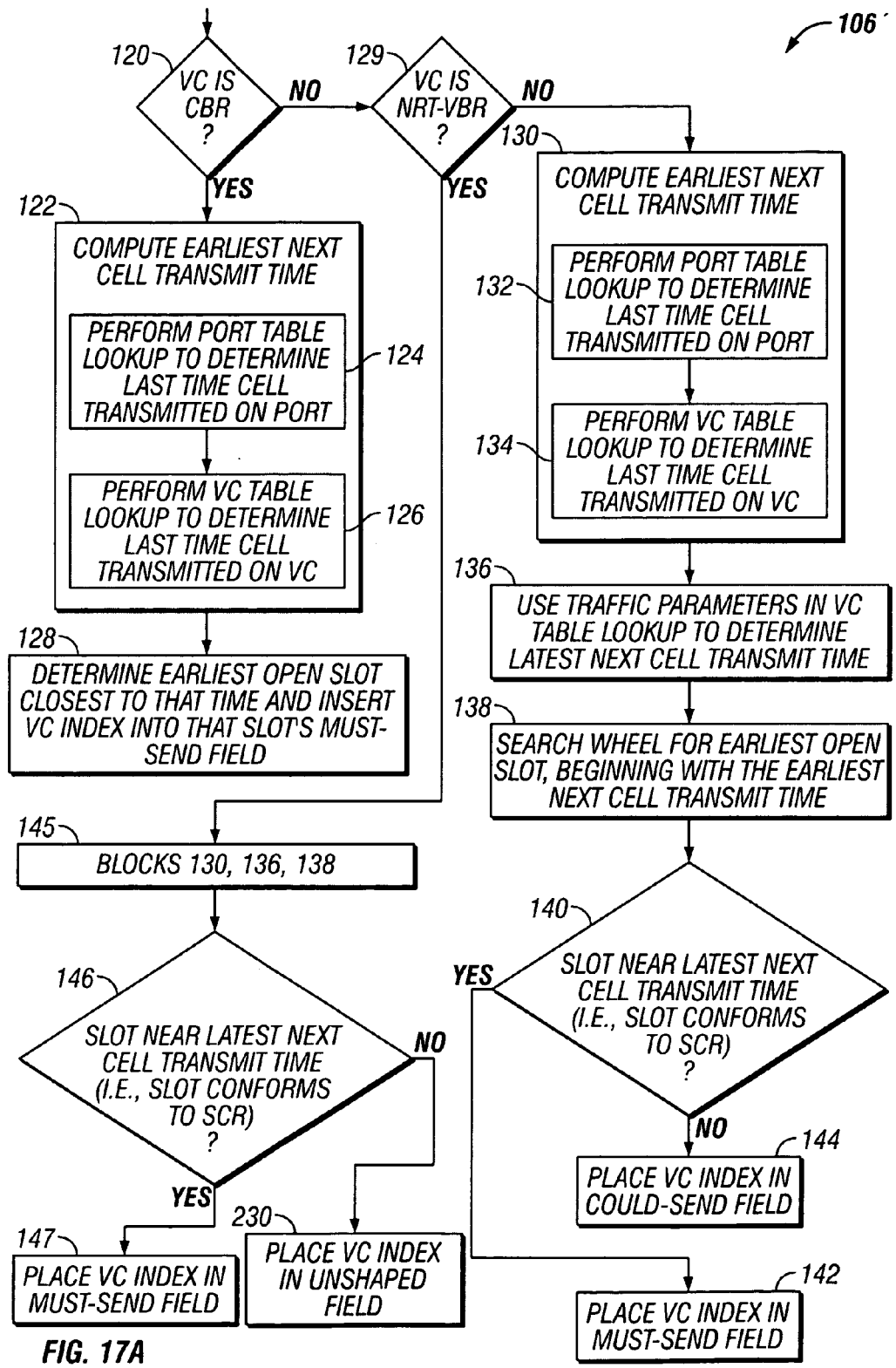
FIGS. 17A and 17B are flow diagrams of schedule determination processes for shaped and unshaped traffic, respectively, performed by the scheduler of FIG. 16.

Referring to FIG. 17A, the shaped schedule determination 106' is much the same as described earlier with respect to FIG.

8A. Because a single wheel is used, however, a "N" condition at decision 146 results in the VC index being placed in the unshaped field of the wheel 220 (block 230), instead of being handled under the unshaped scheduling of the separate unshaped wheel of the two wheel implementation (as illustrated in FIG. 8A).

Figure 17B:
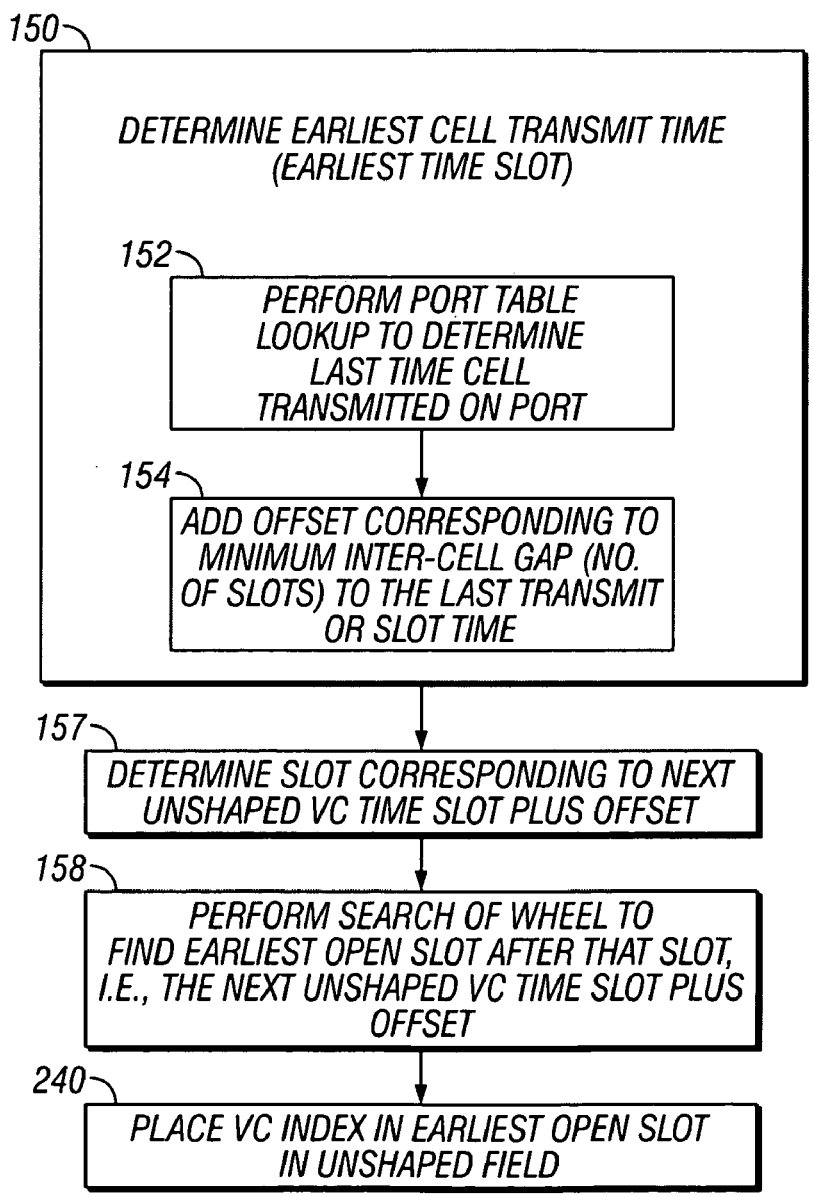

Referring to FIG. 17B, the unshaped schedule determination 116' is as follows. For a UBR scheduling request, an nrt-VBR scheduling request that could not be handled under shaped traffic scheduling or a first chance queue scheduling request, the scheduler process 52' determines 150 the earliest slot time this port could be transmitted by performing 152 a lookup of port information in the ports table 66 to find the last time a cell was transmitted on this port, and adding 154 to that last time slot an offset corresponding to a minimum inter-cell gap (which is the minimum number of slot times between transmits to this port). The scheduler process 52' determines 157 a slot corresponding to the next unshaped VC time-slot plus the offset. The process 52' performs 158 a range search in the wheel 220 to find the earliest open slot after that time (that is, the unshaped VC time-slot plus the offset), and places 240 the VC index in the unshaped field of that earliest open slot in the wheel 220.

Figure 18:
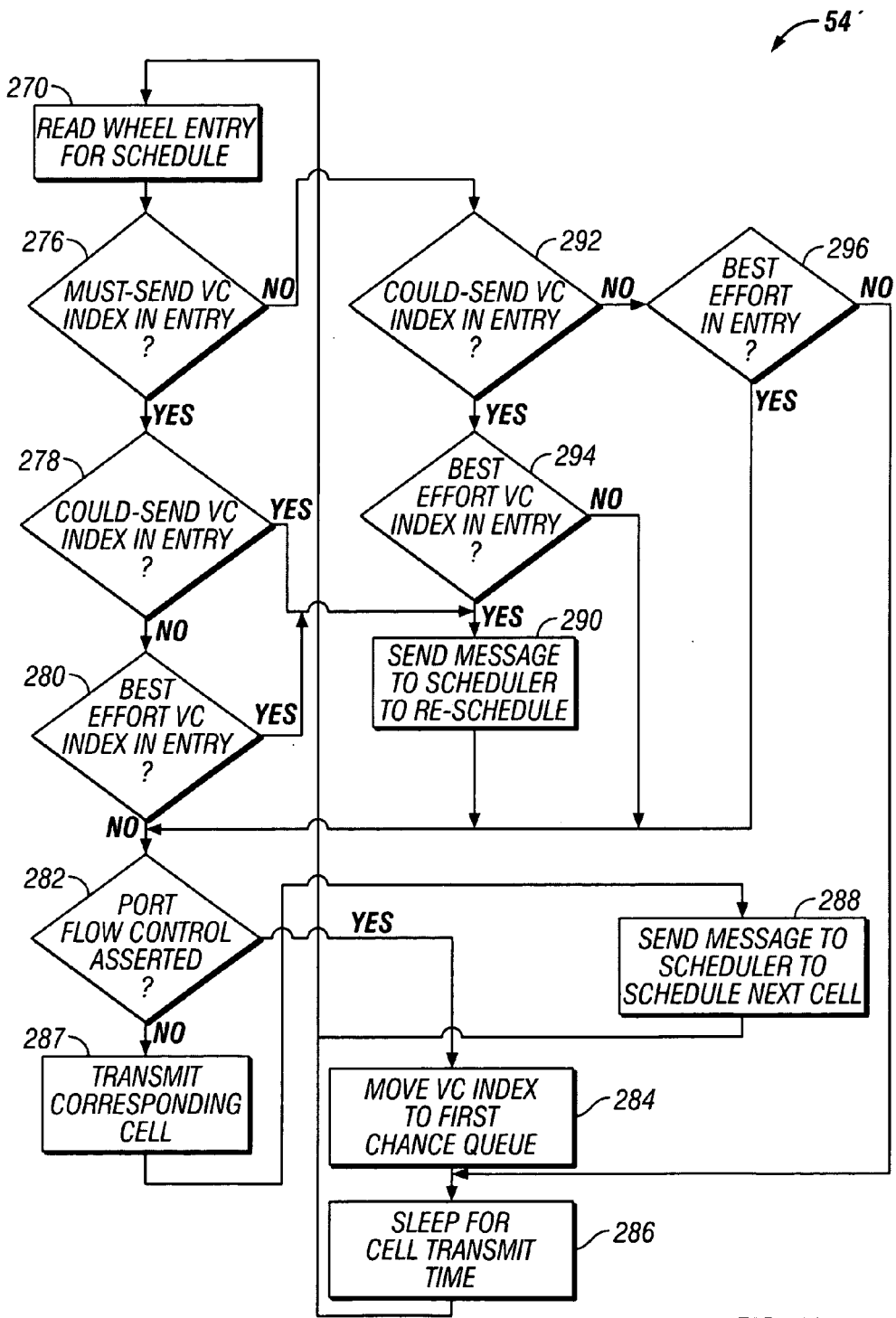
FIG. 18 is a flow diagram of a traffic shaping process used by the SAR device of FIG. 14.

Referring to FIG. 18, the shaper/transmit process 54' reads 270 the wheel 220 for the next slot 222 to be sent. The process 54' determines 276 if a VC index is present in the must-send field. If, at 276, it is determined that a VC index is present in the must-send field and it is further determined, at 278, that no VC index is present in the could-send field, and, at 280, that no VC index is present in the Best Effort field, the process 54' determines 282 if port flow control is asserted. If it is, the process 54' moves 284 the VC index to the first chance queue. After the process 54' has moved the VC index to the first chance queue, it goes to sleep 286 for the cell transmit time. If, at 282, it is determined that port flow control is not asserted, the process 54' issues 287 a transmit command to transmit the corresponding cell and sends 288 a message to the scheduler 52' to scheduler the next cell. After 287 or 288, the process 54' returns to 270 to read the next wheel entry.

If, at 278 and 280, the process 54' determines that either a could-send VC index or Best Effort VC index, or both, is present in that slot along with a must-send VC index, the process 54' sends 290 a re-schedule message to the scheduler 52' prior to determining if port control is asserted at 282. The re-schedule message informs the scheduler 52' that the VC corresponding to the VC index in the Best Effort and/or could-send fields is to be re-scheduled.

If, at 276, the process 54' determines that the must-send field is empty, the process 54' determines 292 if a could-send VC index is present in the entry. If so, and the process 54' further determines 294 that a Best Effort VC index is also present in the entry, the process 54' sends 290 a reschedule message to the scheduler to re-schedule the Best Effort VC and proceeds to 282. Otherwise, if no Best Effort VC is scheduled in the entry, the process 54' does not send a reschedule message but proceeds directly to 282. If, at 292, the process 54' determines that no could-send VC index is present in the entry, the process 54' still checks for a Best Effort VC index in the Best Effort field. If that field contains a VC index, the process 54' proceeds to 282. If, at 296, it is determined that no Best Effort VC is present, the process 54' proceeds to 286.

Returning to the multi-threaded processing architecture of FIGS. 12-13, it will be understood that a single wheel such as the wheel 220 described above could be used instead of the two wheel arrangement that is shown. Thus, each of the thread pairs 210 would operate on one wheel as opposed to two separate wheels for shaped and unshaped traffic.

Other embodiments are within the scope of the following claims.

What is claimed is:

1. A method comprising:
   determining first transmit schedules for first cells, second transmit schedules for second cells, and third transmit schedules for third cells based on service rates and maximum port rates;
   storing the first transmit schedules and the second transmit schedules in a shaped data structure comprising slots, wherein the slots in the shaped data structure comprise a must send field for storing the first transmit schedules and a could send field storing the second transmit schedules;
   storing the third transmit schedules in an unshaped data structure; and
   selecting cells for transmission based on the first, second, and third transmit schedules so that the first transmit schedules for the first cells take priority over the second transmit schedules for the second cells and the third transmit schedules for the third cells and the second transmit schedules for the second cells take priority over the third transmit schedules for the third cells,
   wherein storing the first transmit schedules comprises
      determining if a service rate associated with a cell is constant bit rate (CBR),
      if the associated service rate is determined to be CBR, identifying from among the slots in the shaped data structure, an earliest open slot, and entering into the must send field of the earliest open slot a virtual circuit index for the virtual circuit associated with the cell,
      if the associated service rate is determined not to be CBR, determining if the service rate associated with the cell is real-time variable bit rate (rt-VBR),
      if the associated service rate is determined to be rt-VBR, determining if an earliest open time slot available for the rt-VBR cell in the shaped data structure is near in time to a latest cell transmit time,
      if the earliest open time slot available for the rt-VBR cell in the shaped data structure is determined not to be near in time to a latest cell transmit time, entering the virtual circuit index associated with the rt-VBR cell into the unshaped data structure, and
      if the earliest open time slot available for the rt-VBR cell in the shaped data structure is determined to be near in time to a latest cell transmit time, entering the virtual circuit index associated with the rt-VBR cell into a could-send field of a slot in the shaped data structure.

2. The method of claim 1, further comprising:
   associating the first cells with shaped virtual circuits that use traffic shaping to ensure service rates; and
   associating the second cells with unshaped virtual circuits that do not use traffic shaping to ensure service rates.

3. The method of claim 2, further comprising:
   providing a shaped data structure for maintaining transmit the first transmit schedules for the first cells and the second transmit schedules for the second cells; and
   providing an unshaped data structure for maintaining the third transmit schedules for the third cells.

4. The method of claim 3, wherein:
   the shaped and unshaped data structures comprise time slots; and
   the number of time slots is based on a maximum aggregate port bandwidth.

5. The method of claim 3, further comprising advancing the second data structure only in response to transmission of a cell associated with the second data structure.

6. The method of claim 2, wherein the third cells comprise cells for which unspecified bit rates (UBR) are specified.

7. The method of claim 2, wherein the third cells comprise cells for which non-real-time virtual bit rates (nrt-VBR) are specified.

8. The method of claim 2, further comprising:
maintaining the first transmit schedules for the first cells, the second transmit schedule for the second cells, and the third transmit schedules for the third cells in at least one data structure that is partitioned into time slots.

9. The method of claim 8, wherein each slot includes a plurality of fields, the plurality of fields including a must send field and a could send field for time slots associated with shaped virtual circuits, and a best effort field for time slots associated with unshaped virtual circuits.

10. The method of claim 8, wherein, determining first transmit schedules comprises:
for each first cell, selecting an earliest available one of the time slots associated with shaped virtual circuits based on an earliest next cell transmit time.

11. The method of claim 8, further comprising:
maintaining the third transmit schedules for the third cells in an array of entries each having an associated priority.

12. The method of claim 11, wherein-selecting cells for transmission comprises:
reading an entry from the array based on a Weighted Round Robin selection.

13. The method of claim 8, wherein selecting comprises:
reading a current slot in the data structure;
if the current slot includes an entry, issuing a transmit command to transmit a cell corresponding to the entry.

14. The method of claim 13, further comprising
if port flow control is asserted for a port from which the cell corresponding to the entry is to be transmitted, moving the entry to the first chance queue.

15. The method of claim 13, further comprising
if port flow control is asserted for a port from which the cell corresponding to the entry is to be transmitted,
determining if another one of the fields in the current slot stores an entry associated with a port that is different from the port for which port flow control is asserted, and
issuing a command to transmit a cell corresponding to the entry in the other one of the fields.

16. The method of claim 8, wherein determining transmit schedules comprises converting a bandwidth value expressed in bits per second to a time slot.

17. The method of claim 8, wherein:
the at least one data structure comprises multiple data structures, each mapping to a different port, and
the determining and the selecting are performed by multiple execution threads and each pair of threads performs the determining and the selecting for a different one of the data structures.

18. The method of claim 1, wherein the first cells comprise cells for which a constant bit rate (CBR) of service is specified.

19. The method of claim 9, wherein the second cells comprise cells for which a real-time variable bit rate (rt-VBR) of service is specified.

20. The method of claim 1, wherein determining comprises:
computing for each first cell an earliest next cell transmit time.

21. The method of claim 1, wherein identifying the earliest open slot comprises searching a hierarchical arrangement of bit vectors used to convey slot information.

22. The method of claim 1, further comprising:
reading a current slot in the shaped data structure;
if the current slot includes an entry in the must send field, issuing a transmit command to transmit a cell corresponding to the entry;
if the current slot also includes a second entry in the could send field, moving the second entry to the first chance queue; and
if the current slot in the shaped data structure is empty, issuing a transmit command to transmit a cell associated with an entry in a current slot of the unshaped data structure.

23. The method of claim 22, further comprising
if port flow control is asserted for the port from which the cell in the current slot of the unshaped data structure is to be transmitted, moving the entry from the current slot of the unshaped data structure to the first chance queue.

24. The method of claim 22, wherein determining further comprises:
determining if the first chance queue includes an entry;
if the first chance queue is determined to include the entry, dequeueing the entry from the first chance queue and copying the entry to a slot in the unshaped control structure.

25. The method of claim 24, wherein copying the entry to the slot in the unshaped control structure comprises identifying the slot in the unshaped control structure as the earliest cell transmit time slot that is not in conflict with a slot in the shaped control structure that includes an entry.

26. The method of claim 25, wherein identifying the slot in the unshaped control structure further comprises:
determining a last time when a cell was transmitted from a port associated with a virtual circuit for transmitting the cell; and
adding to the last time an offset corresponding to a minimum inter-cell gap for the port.

27. The method of claim 1, wherein determining transmit schedules comprises performing separate port bandwidth computations for each of the first transmit schedules, the second transmit schedules, and the third transmit schedules.

28. A network data aggregation device having first ports for receiving packets from a service network and transmitting cells associated with the packets from second ports to a service user over a DSL link, comprising:
a receiving device to generate requests to schedule the cells for transmission on virtual circuits from the second ports;
scheduling data structures including
a first data structure comprising a first collection of ordered scheduling slots that each specify a time when an associated cell is scheduled for transmission, wherein each scheduling slot in the first collection comprises a must send field and a could send field and cells associated with the must send field take priority over cells associated with the could send field, and
a second data structure comprising a second collection of ordered scheduling slots that each specify a time when an associated cell is scheduled for transmission, wherein cells associated with scheduling slots in the first data structure take priority over cells associated with scheduling slots in the second data structure;
a scheduler to process the requests, the scheduler determining, for each request, whether to schedule the cells for transmission on the first data structure or the second data structure and a schedule for transmission of the cells; and a traffic shaper to select a cell for transmission from the first data structure or the second scheduling data structure, wherein selecting the cell reading a current slot in the first data structure, if the current slot includes an entry, issuing a transmit command to transmit a cell corresponding to the entry; and if port flow control is asserted for a port from which the cell corresponding to the entry is to be transmitted, determining if another one of the fields in the current slot of the first data structure stores an entry associated with a port that is different from the port for which port flow control is asserted, and issuing a command to transmit a cell corresponding to the entry in the other one of the fields.

29. The network data aggregation device of claim 28, wherein the second data structure advances only in response to transmission of a cell associated with the second data structure.

30. A method comprising:

determining first transmit schedules for first cells, second transmit schedules for second cells, and third transmit schedules for third cells based on service rates and maximum port rates;

storing the first transmit schedules and the second transmit schedules in a shaped data structure comprising slots, wherein the slots in the shaped data structure comprise a must send field for storing the first transmit schedules and a could send field storing the second transmit schedules;

storing the third transmit schedules in an unshaped data structure; and selecting cells for transmission based on the first, second, and third transmit schedules so that the first transmit schedules for the first cells take priority over the second transmit schedules for the second cells and the third transmit schedules for the third cells and the second transmit schedules for the second cells take priority over the third transmit schedules for the third cells, wherein storing the first transmit schedules comprises determining if a service rate associated with a cell is constant bit rate (CBR), if the associated service rate is determined to be CBR, identifying from among the slots in the shaped data structure, an earliest open slot, and entering into the must send field of the earliest open slot a virtual circuit index for the virtual circuit associated with the cell, wherein identifying the earliest open slot comprises searching a hierarchical arrangement of bit vectors used to convey slot information.

31. A method comprising:

determining first transmit schedules for first cells, second transmit schedules for second cells, and third transmit schedules for third cells based on service rates and maximum port rates;

storing the first transmit schedules and the second transmit schedules in a shaped data structure comprising slots, wherein the slots in the shaped data structure comprise a must send field for storing the first transmit schedules and a could send field storing the second transmit schedules;

storing the third transmit schedules in an unshaped data structure; and selecting cells for transmission based on the first, second, and third transmit schedules so that the first transmit schedules for the first cells take priority over the second transmit schedules for the second cells and the third transmit schedules for the third cells and the second transmit schedules for the second cells take priority over the third transmit schedules for the third cells, wherein selecting cells comprises reading a current slot in the shaped data structure, if the current slot includes an entry in the must send field, issuing a transmit command to transmit a cell corresponding to the entry, if the current slot also includes a second entry in the could send field, moving the second entry to the first chance queue, and if the current slot in the shaped data structure is empty, issuing a transmit command to transmit a cell associated with an entry in a current slot of the unshaped data structure; and wherein determining transmit schedules comprises determining if the first chance queue includes an entry, and if the first chance queue is determined to include the entry, dequeueing the entry from the first chance queue and copying the entry to a slot in the unshaped control structure.

32. The method of claim 31, wherein copying the entry to the slot in the unshaped control structure comprises identifying the slot in the unshaped control structure as the earliest cell transmit time slot that is not in conflict with a slot in the shaped control structure that includes an entry.

33. The method of claim 32, wherein identifying the slot in the unshaped control structure further comprises:

determining a last time when a cell was transmitted from a port associated with a virtual circuit for transmitting the cell; and adding to the last time an offset corresponding to a minimum inter-cell gap for the port.

34. The method of claim 31, further comprising:

associating the first cells and the second cells with shaped virtual circuits that use traffic shaping to ensure service rates; and associating the third cells with unshaped virtual circuits that do not use traffic shaping to ensure service rates.

35. A method comprising:

associating first cells with shaped virtual circuits that use traffic shaping to ensure service rates;

associating second cells with unshaped virtual circuits that do not use traffic shaping to ensure service rates;

determining first transmit schedules for the first cells, second transmit schedules for the second cells, and third transmit schedules for third cells based on service rates and maximum port rates;

maintaining the first transmit schedules for the first cells, the second transmit schedule for the second cells, and the third transmit schedules for the third cells in at least one data structure that is partitioned into time slots; and selecting cells for transmission based on the first, second, and third transmit schedules so that the first transmit schedules for the first cells take priority over the second transmit schedules for the second cells and the third transmit schedules for the third cells and the second transmit schedules for the second cells take priority over the third transmit schedules for the third cells, wherein selecting comprises reading a current slot in the data structure, if the current slot includes an entry, issuing a transmit command to transmit a cell corresponding to the entry; and if port flow control is asserted for a port from which the cell corresponding to the entry is to be transmitted, determining if another one of the fields in the current slot stores an entry associated with a port that is different from the port for which port flow control is asserted, and issuing a command to transmit a cell corresponding to the entry in the other one of the fields.

* * * * *